US012202103B2

(12) United States Patent
Sergyeyenko et al.

(10) Patent No.: US 12,202,103 B2
(45) **Date of Patent: *Jan. 21, 2025**

(54) SCREWDRIVER AND TOOL HOLDER

(71) Applicant: Black & Decker Inc., New Britain, CT (US)

(72) Inventors: Oleksiy P. Sergyeyenko, Baldwin, MD (US); JianHui Jiang, Suzhou (CN); JianFeng Zhang, Suzhou (CN); Ana Garcia, Baltimore, MD (US); Paul Gerard Gross, White Marsh, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,278

(22) Filed: Oct. 16, 2023

(65) Prior Publication Data

US 2024/0051096 A1 Feb. 15, 2024

Related U.S. Application Data

(63) Continuation of application No. 17/978,455, filed on Nov. 1, 2022, now Pat. No. 11,787,020, which is a continuation of application No. 16/803,268, filed on Feb. 27, 2020, now Pat. No. 11,511,402.

(60) Provisional application No. 62/824,024, filed on Mar. 26, 2019, provisional application No. 62/824,038, filed on Mar. 26, 2019.

(51) Int. Cl.
*B25B 23/00* (2006.01)
*B25B 21/00* (2006.01)

(52) U.S. Cl.
CPC .......... *B25B 23/0035* (2013.01); *B25B 21/00* (2013.01)

(58) Field of Classification Search
CPC .... B25B 23/0035; B25B 21/00; B25B 21/007
See application file for complete search history.

(56) References Cited

U.S. PATENT DOCUMENTS

| | | | |
|---|---|---|---|
| 427,460 | A | 5/1890 | Chantrell |
| 2,569,069 | A | 9/1951 | Motel |
| 2,726,091 | A | 12/1955 | Topar |
| 2,842,020 | A | 7/1958 | Tarquinio |
| 2,855,679 | A | 10/1958 | Gibble |

(Continued)

FOREIGN PATENT DOCUMENTS

| | | | |
|---|---|---|---|
| CN | 208495830 | U | 2/2019 |
| CN | 109454252 | A | 3/2019 |

(Continued)

OTHER PUBLICATIONS

Prior Art Dewalt Screwdriver Bit Set, Impact Ready, FlexTorq, 40-Piece (DWA2T40IR)—https://www.amazon.com/DEWALT-DWA2T40IR-FlexTorq-Driving-40-Piece/dp/B00GMXFK3G?ref_=BSellerC&pf_rd_p=1fbcf6b0-07cf-5cd4-998b-6713b5d60bf5&pf_rd_s=merchandised-search-6&pf_rd_t=101&pf_rd_i=2445469011&pf_rd_m=ATVPDKIKX0DER&pf_rd_r=QCKA0QNYWFJ0PZTJ05GC&pf_rd_r=QCKA0QNYWFJ0PZTJ05GC&pf_rd_p=1fbcf6b0-07cf-5cd4-998b-6713b5d60bf5.

(Continued)

*Primary Examiner* — David B. Thomas
(74) *Attorney, Agent, or Firm* — Stephen R. Valancius

(57) ABSTRACT

The present disclosure relates to a powered screwdriver. The powered screwdriver includes a housing, a motor housed in the housing and a tool holder driven by the motor. The tool holder selectively holds both a screwdriver bit and a hex key. The hex key includes a bend such that legs of the hex key are transverse to one another.

15 Claims, 30 Drawing Sheets

(56) References Cited

U.S. PATENT DOCUMENTS

| | | | | |
|---|---|---|---|---|
| 3,766,811 | A | 10/1973 | Callahan | |
| 3,850,056 | A | 11/1974 | Allen | |
| 4,772,765 | A | 9/1988 | Markle et al. | |
| 5,267,129 | A | 11/1993 | Anderson | |
| 5,375,489 | A | 12/1994 | McClure | |
| 5,473,519 | A | 12/1995 | McCallops et al. | |
| 5,525,842 | A | 6/1996 | Leininger | |
| 5,806,625 | A | 9/1998 | Katz | |
| 6,010,154 | A | 1/2000 | Payne et al. | |
| 6,050,698 | A | 4/2000 | Lee | |
| 6,209,425 | B1 | 4/2001 | Hu | |
| 6,273,200 | B1 | 8/2001 | Smith et al. | |
| 6,332,381 | B1 | 12/2001 | Vasudeva | |
| 6,341,544 | B1 | 1/2002 | Falzone | |
| 6,382,057 | B1 | 5/2002 | Kienholz | |
| 6,467,556 | B2 | 10/2002 | Alsruhe | |
| 6,598,503 | B1 | 7/2003 | Cunningham | |
| 6,626,068 | B2 | 9/2003 | McKivigan | |
| 6,742,786 | B2 | 6/2004 | Casel et al. | |
| 6,901,825 | B1 | 6/2005 | Lebron | |
| 7,080,964 | B2 | 7/2006 | Riley et al. | |
| 7,946,203 | B2 | 5/2011 | Johnson et al. | |
| 8,033,200 | B2 | 10/2011 | Johnson et al. | |
| 8,047,100 | B2 | 11/2011 | King | |
| 8,317,350 | B2 | 11/2012 | Friedman et al. | |
| 8,328,381 | B2 | 12/2012 | Dixon et al. | |
| 8,336,428 | B2 | 12/2012 | Johnson et al. | |
| 8,479,613 | B2 | 7/2013 | Saito | |
| 8,506,108 | B2 | 8/2013 | Friedman et al. | |
| 8,757,033 | B2 | 6/2014 | Johnson et al. | |
| 9,193,058 | B2 | 11/2015 | Gallegos | |
| 9,221,155 | B1 | 12/2015 | Cantlon | |
| 9,242,355 | B2 | 1/2016 | Sergyeyenko et al. | |
| 9,511,482 | B2 | 12/2016 | Stonefield | |
| 9,545,707 | B2 | 1/2017 | Johnson et al. | |
| 9,604,349 | B2 | 3/2017 | Johnson et al. | |
| 10,040,181 | B2 | 8/2018 | Fu et al. | |
| 10,166,668 | B2 | 1/2019 | Baskar et al. | |
| 10,173,307 | B2 | 1/2019 | Sergyeyenko et al. | |
| 10,207,400 | B2 | 2/2019 | Gallegos | |
| 10,226,831 | B2 | 3/2019 | Moss et al. | |
| 11,511,402 | B2 * | 11/2022 | Sergyeyenko | B25B 21/00 |
| 11,787,020 | B2 * | 10/2023 | Sergyeyenko | B25B 21/00<br>81/57.42 |
| 2002/0096023 | A1 | 7/2002 | Sanford | |
| 2011/0203821 | A1 | 8/2011 | Puzio et al. | |
| 2013/0305886 | A1 * | 11/2013 | Gallegos | B25G 3/12<br>81/177.1 |
| 2014/0251090 | A1 * | 9/2014 | Johnson | B25B 13/461<br>81/60 |
| 2017/0144293 | A1 | 5/2017 | Johnson et al. | |
| 2018/0354104 | A1 * | 12/2018 | Su | B25B 23/0035 |

FOREIGN PATENT DOCUMENTS

| | | | |
|---|---|---|---|
| DE | 20215382 | U1 | 4/2003 |
| DE | 202009007665 | U1 | 8/2009 |
| DE | 202009007893 | U1 | 8/2009 |
| DE | 202009010865 | U1 | 1/2010 |
| DE | 102014103244 | A1 | 8/2015 |
| EP | 1658151 | A1 | 5/2006 |
| EP | 2248633 | B1 | 7/2013 |
| EP | 2653268 | B1 | 6/2017 |
| EP | 2223783 | B1 | 7/2018 |
| GB | 2431983 | B | 6/2008 |
| GB | 2444651 | B | 3/2009 |
| JP | 8-252778 | A | 10/1996 |
| JP | 5046348 | B1 | 10/2012 |

OTHER PUBLICATIONS

Prior Art Black+Decker Screwdriver Bit Set / Drill Bit Set, 109-Piece (BDA91109) https://www.amazon.com/BLACK-DECKER-BDA91109-Combination-Accessory/dp/B009QYLOD8?ref_=BSellerC&pf_rd_p=1fbcf6b0-07cf-5cd4-998b-6713b5d60bf5&pf_rd_s=merchandised-search-6&pf_rd_t=101&pf_rd_i=2445469011&pf_rd_m=ATVPDKIKX0DER&pf_rd_r=QCKA0QNYWFJ0PZTJ05GC&pf_rd_r=QCKA0QNYWFJ0PZTJ05GC&pf_rd_p=1fbcf6b0-07cf-5cd4-998b-6713b5d60bf5.

Prior Art Wiha 72596 10 Piece Hex SAE Insert Bit Set https://www.amazon.com/Wiha-72596-Piece-Hex-Insert/dp/B01BXBWXW2/ref=sr_1_18?keywords=hex+bits&qid=1582319261&s=hi&sr=1-18.

Prior Art Stanley 85-753 22 Piece Long Arm SAE & Metric Hex Key Set https://www.amazon.com/Stanley-85-753-Piece-Long-Metric/dp/B000NIFJQE/ref=sr_1_4?keywords=hex+keys+stanley&qid=1582319332&s=hi&sr=1-4.

Prior Art TEKTON Hex Key Wrench Set, 30-Piece (.028-3/8 in, 7-10 mm) | 25253 https://www.amazon.com/TEKTON-Wrench-Metric-30-Piece-25253/dp/B00I5TH074/ref=sr_1_6?keywords=hex+keys+stanley&qid=1582319366&s=hi&sr=1-6.

EP EESR dated, Aug. 7, 2020 in corresponding EP application 20165712.9.

* cited by examiner

SCREWDRIVER AND TOOL HOLDER

CROSS-REFERENCE TO RELATED APPLICATIONS

This application is a continuation of U.S. application Ser. No. 17/978,455 filed on Nov. 1, 2022, which is a continuation of U.S. application Ser. No. 16/803,268 filed on Feb. 27, 2020, which claims the benefit of and priority to U.S. Provisional Application No. 62/824,024 filed on Mar. 26, 2019, and U.S. Provisional Application No. 62/824,038 filed on Mar. 26, 2019, all entitled Screwdriver and Tool Holder. The entire contents of each are incorporated herein by reference.

BACKGROUND OF THE INVENTION

The present disclosure relates to tool holder. In the past, tool holders for screwdrivers have been configured to hold a screwdriver bit. It is desired to provide a more flexible tool holder.

SUMMARY OF EMBODIMENTS OF THE INVENTION

One aspect of the present disclosure relates to a tool holder and a screwdriver with a tool holder. According to one aspect there is an exemplary embodiment of a screwdriver. The screwdriver includes a housing, a motor housed in the housing and a tool holder driven by the motor. The tool holder is configured to selectively hold both a screwdriver bit and a hex key. The hex key includes a bend.

The screwdriver bit may have a hexagonal insertion portion which engages with the tool holder.

The hexagonal insertion portion may be 0.625 of an inch or less in length.

The hexagonal insertion portion may be about 0.5 of an inch or less in length.

The bend may be such that the hex key includes a first leg and a second leg, wherein the first leg is transverse to the second leg.

The first leg may be longer than the second leg.

The tool holder may be an accessory attached to a hexagonal bit holder.

The tool holder may be integral with the screwdriver.

According to another aspect, there is an exemplary embodiment of a screwdriver including a housing, a motor housed in the housing and a tool holder driven by the motor. The tool holder is configured to selectively hold both a screwdriver bit, a first hex key and a second hex key. The first hex key includes a first key bend and has a first diameter. The second hex key includes a second key bend and has a second diameter, different than the first diameter.

The screwdriver bit may have a hexagonal insertion portion which engages with the tool holder.

The hexagonal insertion portion may be 0.625 of an inch or less in length.

The hexagonal insertion portion may be about 0.5 of an inch or less in length.

The tool holder may be integral with the screwdriver.

According to another aspect, there is an exemplary embodiment of a method of using a powered screwdriver, the method including inserting a screwdriver bit into a tool holder of the powered screwdriver; activating a motor of the screwdriver to rotate the tool holder; driving a first fastener with the screwdriver bit; removing the screwdriver bit from the tool holder; inserting a hex key into the tool holder, the hex key including a bend; activating the motor of the screwdriver to rotate the tool holder; and driving a second fastener with the hex key.

The screwdriver bit may have a hexagonal insertion portion which engages the tool holder.

The hexagonal insertion portion may be 0.625 of an inch or less in length.

The hexagonal insertion portion may be about 0.5 of an inch or less in length.

The bend may be such that the hex key includes a first leg and a second leg, wherein the first leg is transverse to the second leg.

The first leg may be longer than the second leg.

According to another aspect, there is an exemplary embodiment of a screwdriver including a housing, a motor housed in the housing, and a tool holder driven by the motor. The tool holder may include a retainer.

The retainer may have a partial hexagon shape and a retainer side opening.

The tool holder may further include a sleeve radially outside of the retainer.

The sleeve may include a sleeve side opening that is aligned with the retainer side opening.

The tool holder may be configured to selectively hold both a screwdriver bit and a hex key.

The hex key may include a bend.

The sleeve may further include a circumferential opening that communicates with the sleeve side opening and extends circumferentially around a portion of the sleeve.

The circumferential opening may have a variable height.

The circumferential opening may have a first portion with a first height and a second portion with a second height.

The circumferential opening may have an angled section which provides a continuously variable height.

According to another aspect, there is an exemplary embodiment of a screwdriver including a housing, a motor housed in the housing and a tool holder driven by the motor. The tool holder includes a retainer, wherein the retainer has a partial hexagon shape, a first retainer side opening and a second retainer side opening. The tool holder further includes a sleeve radially outside of the retainer. The sleeve includes a first sleeve side opening that is aligned with the first retainer side opening. The sleeve includes a second sleeve side opening that is aligned with the second retainer side opening.

The tool holder may be configured to selectively hold both a screwdriver bit and a hex key.

The hex key may include a bend.

The sleeve may further include a circumferential opening that communicates with the sleeve side opening and extends circumferentially around a portion of the sleeve.

According to another aspect, there is an exemplary embodiment of a screwdriver including a housing, a motor housed in the housing and a tool holder driven by the motor. The tool holder includes a retainer configured to hold a hex bit. The tool holder further includes a sleeve and a lock.

The sleeve and lock are located radially outward of the retainer.

The lock may be configured to rotate relative to the sleeve.

The sleeve and the lock may be configured to together with the retainer hold a hex key that includes a bend.

The hex key may have a hexagonal cross section.

The hex key may have one bend.

The hex key may have two ends, each end having a hexagonal cross section.

The hex key may have a circular cross section in a connection portion connecting the two ends.

According to another aspect, there is an exemplary embodiment of a method of using a powered screwdriver including a tool holder, the method including inserting a hexagonal screwdriver bit into the tool holder; driving a first fastener with the screwdriver bit; removing the screwdriver bit from the tool holder; inserting a hex bit including a first leg and a second leg transverse to the first leg into the tool holder; and driving a second fastener with the hex bit.

The tool holder may include a retainer including a partial hexagonal shape for retaining at least the screwdriver bit.

The tool holder may include a sleeve and a lock.

The sleeve and the lock may be disposed radially outwardly of the retainer.

The lock may rotate relative to the sleeve.

The retainer may include a side opening.

The lock may include an opening which can be aligned with the side opening of the retainer.

The sleeve may include an opening.

When the hex bit is held by the tool holder, the first leg of the hex bit may project out of the side opening of the retainer.

When the hex bit is held by the tool holder, the second leg of the hex bit may project out of the front of the retainer.

The method may further include locating the lock in an open position so that the hex bit can be inserted into the tool holder.

The method may further include inserting the hex bit into the tool holder, and rotating the lock to secure the hex bit in the tool holder.

The lock may be rotatable between an open position in which the hex bit can be inserted into and removed from the tool holder and a secured position in which the hex bit is held between the lock and the sleeve.

The lock may have a rear surface.

The rear surface may face the sleeve.

The rear surface may have a first recess which provides clearance for a hex bit of a first size.

The rear surface may have a second recess which provides clearance for a hex bit of a second size.

The method may further include inserting another hex bit of a different size into the tool holder and rotating the lock to a second position to accommodate the another hex bit.

According to another aspect, there is an exemplary embodiment of a screwdriver including a housing, a motor housed in the housing, and a tool holder driven by the motor. The tool holder may include a retainer.

The retainer may have a partial hexagon shape and a retainer side opening.

The tool holder may include a lock and a sleeve.

The lock may be movable relative to the sleeve.

The tool holder may hold a hex screwdriver bit, a hex bit of a first size and a hex bit of a second size.

The lock may be movable between an open position in which the hex bit of the first size and the hex bit of the second size can be inserted into and removed from the tool holder; a first securing position, in which the hex bit of the first size is secured between the lock and the sleeve; and a second securing position, in which the hex bit of the second size is secured between the lock and the sleeve.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
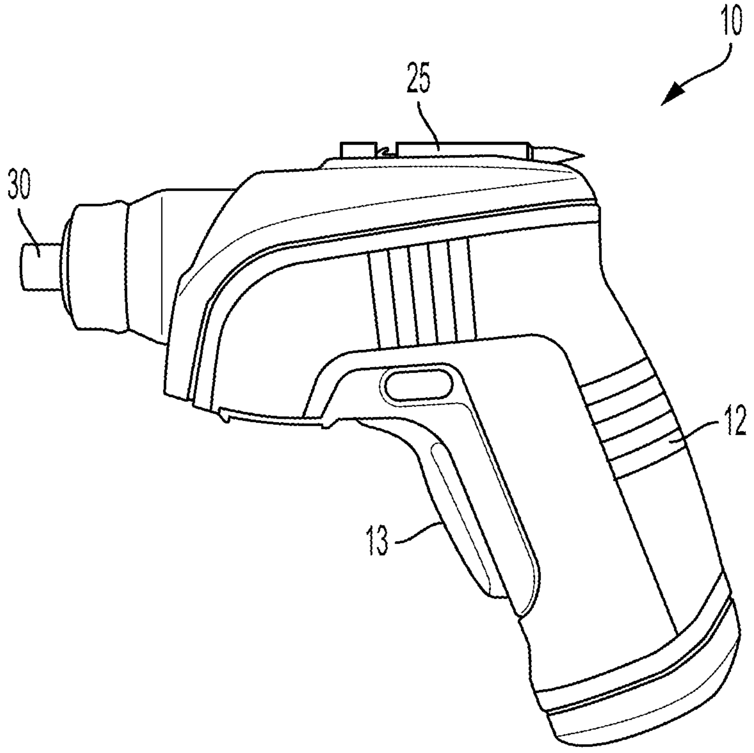
FIG. 1 is a side view of a powered screwdriver.
Figure 2:
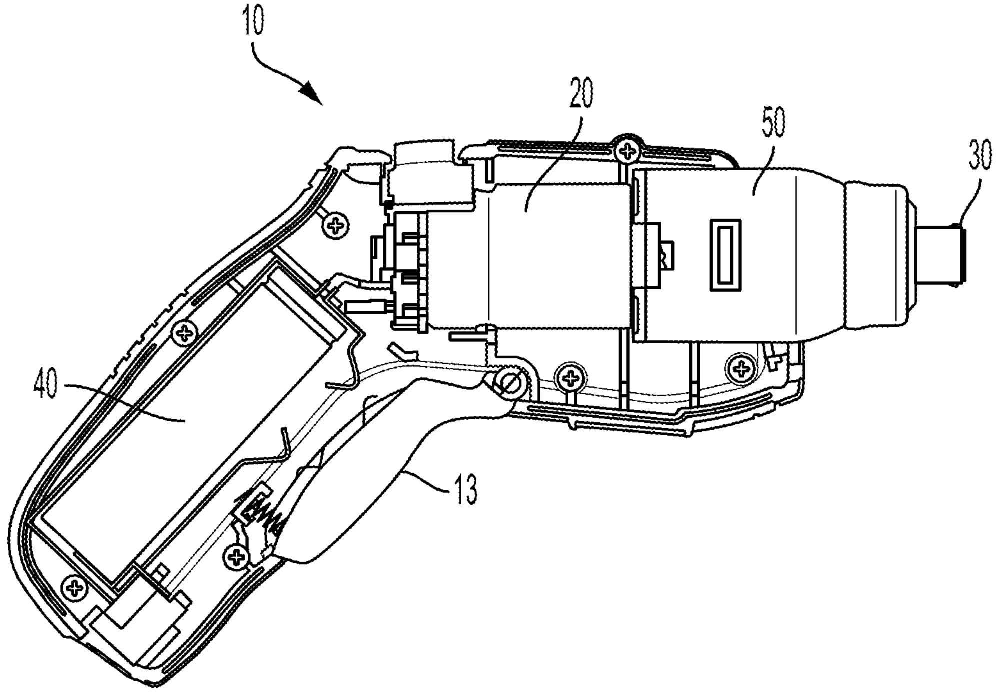
FIG. 2 is a cut-away side view of the powered screwdriver.

FIGS. 1 and 2 illustrate a powered screwdriver. FIG. 1 is a side view of the screwdriver 10 and FIG. 2 is a side view of the screwdriver 10 with one housing half removed. As shown in FIGS. 1 and 2, the powered screwdriver 10 includes a handle 12. It also includes a trigger 13 which a user can depress to actuate the motor 20, which in turn drives a hex bit holder 30. In this case, the hex bit holder 30 is a hex bit holder, which holds standard hex screwdriver bits, such as screwdriver bit 25 shown in FIG. 1.

As shown in FIG. 2, the screwdriver 10 includes a rechargeable battery 40. The rechargeable battery 40 provides power to the motor 20 when the trigger 13 is depressed. The screwdriver also includes a transmission 50 between the hex bit holder 30.

Figure 3:
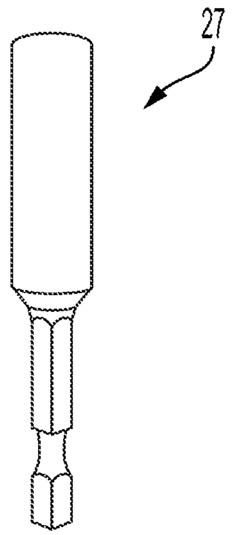
FIG. 3 PRIOR ART
FIG. 3 is a side view of a prior art bit extender.

FIG. 3 illustrates a prior art bit holder extender 27. As is well known, the bit holder extender 27 can be inserted into the hex bit holder 30. The bit holder extender 27 includes a hex bit holder at a front end to receive a bit. Accordingly, a hex screwdriver bit 25 can be inserted into the bit holder extender 27 so that the reach is extended.

Powered screwdrivers are well known in the art and are shown in, for example, U.S. Pat. Nos. 4,772,765; 6,273,200; 6,467,556; 8,047,100; 10,166,668; and U.S. Patent Application Publication No. 2011/0203821. U.S. Pat. Nos. 4,772,765; 6,273,200; 6,467,556; 8,047,100; 10,166,668; and U.S. Patent Application Publication No. 2011/0203821 are each herein incorporated by reference by their entirety. The exemplary embodiments of tool holders described below may be incorporated into the screwdriver 10 shown in FIGS. 1 and 2 or similarly used with or incorporated into various of the powered screwdrivers incorporated by reference.

Figure 7:
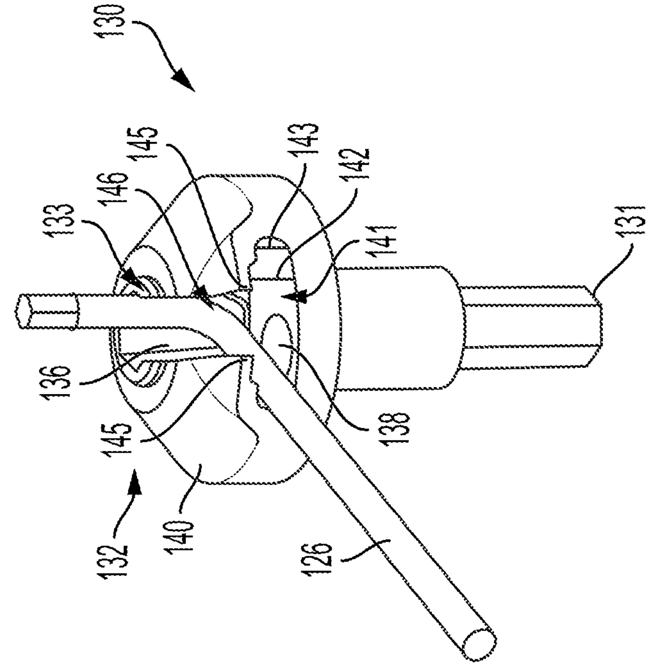
FIG. 7 is another perspective view of the exemplary embodiment of a tool holder holding a hex key.
Figure 8:
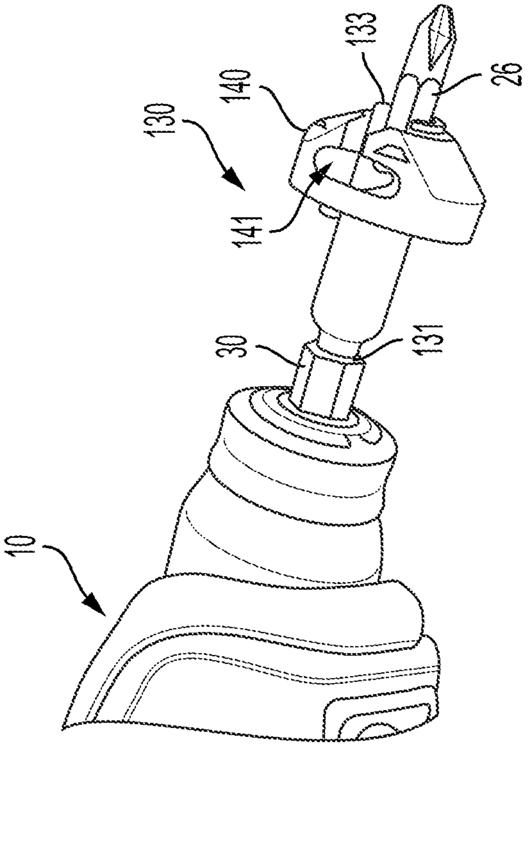
FIG. 8 is another perspective view of the exemplary embodiment of a tool holder holding a hex screwdriver bit and connected to a powered screwdriver.

FIG. 4-9 illustrate a first exemplary embodiment of a tool holder 130 according to the present application. The tool holder 130 of FIGS. 4-9 is capable of holding both hex bits and a variety of hex keys. For example, FIG. 8 illustrates the tool holder 130 holding a screwdriver hex bit 26. The screwdriver hex bit 26 is shorter than the hex bit 25 shown in FIG. 1, though either may be held by the tool holder 130. A variety of other bits, such as a hex drill bit may also be held by the tool holder 130. Additionally, the tool holder 130 may also hold a variety of hex keys, such as those shown in FIGS. 5, 7 and 9. The hex keys may include one or more bends. For example, the hex keys 125 and 126 (FIGS. 5 and 7) include a single bend, while the hex key 127 (FIG. 9) includes two bends. This flexibility in the types of tools that can be held by the tool holder 130 provides a great deal of utility to the user by allowing the user to drive a variety of both hex keys and hex bits.

As shown in FIGS. 4-9, the tool holder 130 includes an insertion portion 131. The insertion portion 131 is a hexagonal insertion portion comprising a solid hexagonal cross-section that fits into the hex bit holder 30 of the screwdriver 10. The insertion portion 131 allows the tool holder 130 to be inserted into a standard hexagonal bit holder.

Figure 6:
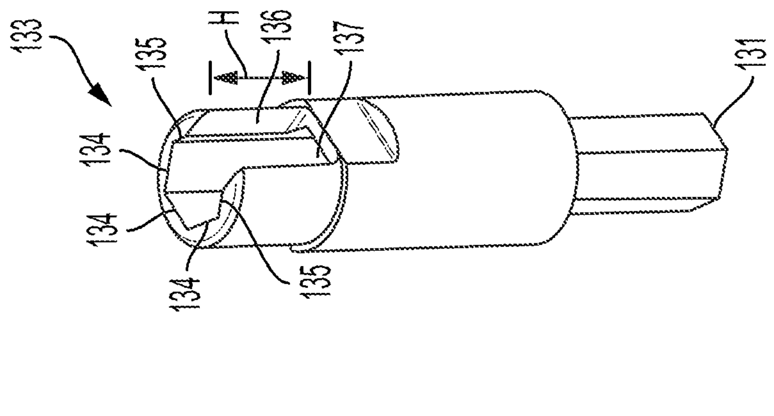
FIG. 6 is a perspective view of a portion of the exemplary embodiment of the tool holder.

The front end of the tool holder 130 includes a tool holding portion 132. The tool holding portion 132 includes both an inner retainer 133 and a sleeve 140. FIG. 6 illustrates the tool holder 130 without the sleeve 140. As shown in FIG. 6, the inner retainer 133 of the exemplary embodiment is similar to a standard extender or bit holder, but includes an opening 136 at its side. Specifically, the retainer 133 includes three full sides 134 of a hexagon shape. Additionally, it includes two partial sides 135 of a hexagon shape. In comparison to a standard hexagonal bit holder, one side is completely removed, and there are two partial sides 135 in place of full sides. Accordingly, while a standard hexagonal bit holder would have six full sides and form a closed hexagonal shape, the retainer 133 of the tool holder 130 of the present exemplary embodiment includes five sides, with three of the sides being full sides 134 and two being partial sides 135. This provides for a partial hexagonal shape and leaves an opening 136 at the side. As will be appreciated, the front of the retainer 133 is open so that a tool such as a screwdriver bit can project forwardly to drive a fastener.

At the same time, the sides 134 and 135 cooperate such that a hexagonal bit is secured from moving axially sideways outwardly through the opening 136. That is, the hexagonal bit cannot fit through the opening 136. Additionally, the inner retainer 133 and its five sides 134/135 contact enough of a hexagonal bit to transfer rotational motion to the bit, such as the bit 25 shown in FIG. 1, the bit 26 shown in FIG. 8 or the extender 27 shown in FIG. 3. There may also be a magnet 137 at a bottom surface of the inner retainer 133, which helps to secure the bits 26, 27 or extender 27 in place.

Figure 5:
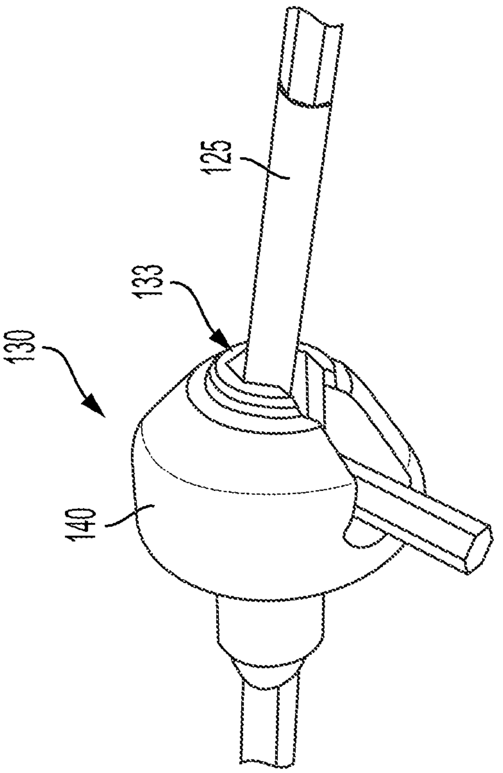
FIG. 5 is another perspective view of the exemplary embodiment of a tool holder holding a hex key.
Figure 9:
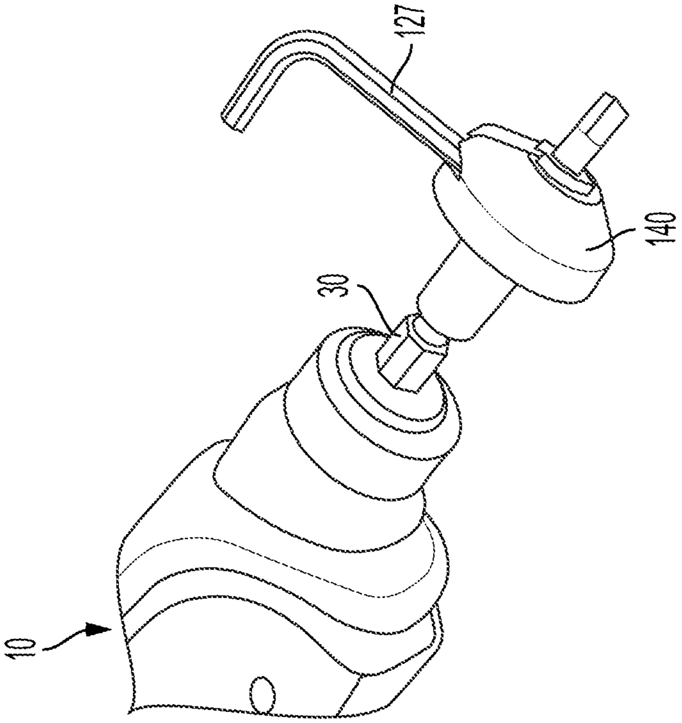
FIG. 9 is another perspective view of the exemplary embodiment of a tool holder holding a hex key and connected to a powered screwdriver.

As shown in FIGS. 4, 5 and 7-9, the tool holder 130 also includes a sleeve 140. As shown in FIGS. 5, 7 and 9, the opening 136 does allow for various hex keys 125, 126, 127 to be accommodated in the tool holder 130, by allowing portions of the hex keys 125, 126, 127 to project through the opening 136. The hex keys may have, for example, diameters of 3 millimeters (mm), 4 mm or 5 mm.

As shown in FIG. 7, the sleeve 140 helps to secure the hex keys, such as hex key 126. As shown in FIG. 140, the sleeve 140 includes a second magnet 138. The magnet 138 is in the sleeve 140 and offset from the central axis of the tool holder 130 (whereas the magnet 137 is aligned with the central axis of the tool holder 130). The hex keys are generally made of metal and the magnet 138 therefore attracts the hex keys, and helps to secure the hex keys to the tool holder 130.

Figure 4:
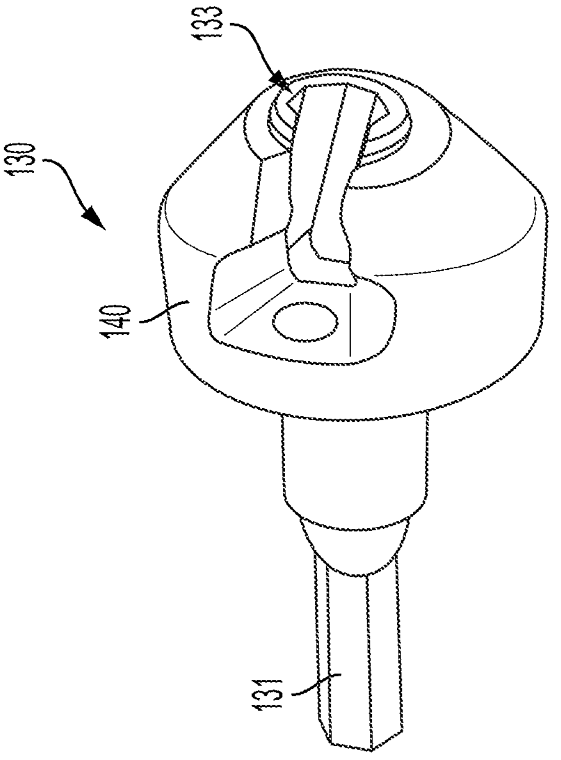
FIG. 4 is a perspective view of an exemplary embodiment of a tool holder.

As is further shown in, for example, FIGS. 4, 5 and 7, the sleeve 140 includes an opening 141. The opening 141 includes a side portion 146 which is aligned with the opening 136. As will be appreciated, the side portion opening 146 aligned retainer opening 136 is necessary for the projection of the hex keys out the side of the tool holder 130. As is further shown, the opening 141 also includes a circumferential portion. This circumferential portion extends circumferentially so that the opening 141 is wider than the opening 136.

The circumferential portion of the opening 141 has varying heights. Particularly, as is shown in FIG. 7, there is a first circumferential portion 142 which is adjacent to the side portion 146. There is a second circumferential portion 143 adjacent to the first circumferential portion 142, and separated from the side portion 146. As shown, the first circumferential portion 142 has a greater height than the second circumferential portion 143 in a stepped fashion. This allows different circumference hex keys to be accommodated. In the exemplary embodiment, the first circumferential portion 142 has a height (axial distance parallel to the central longitudinal axis of the tool holder 130) of 4 millimeters (mm). The second circumferential portion 143 has a height of 3 mm.

Figure 10:
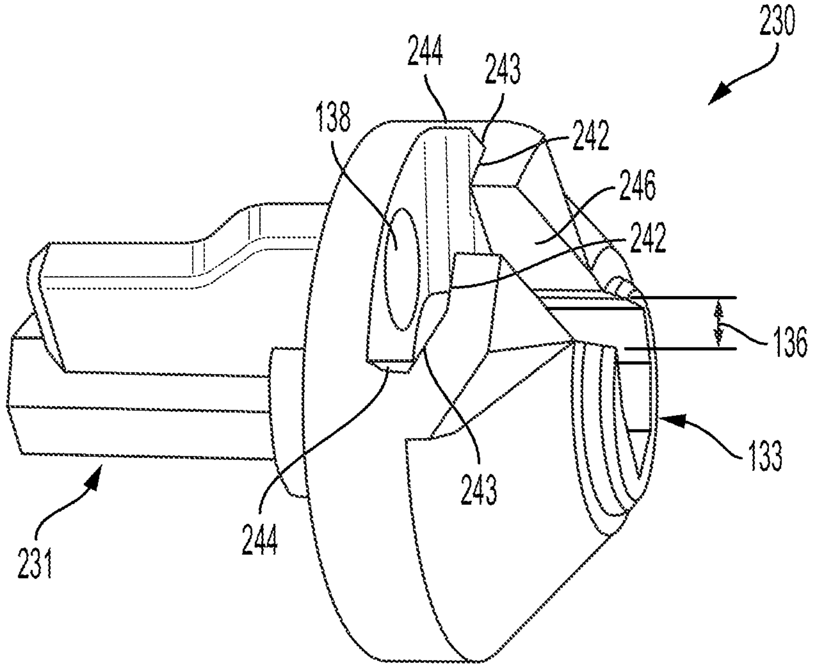
FIG. 10 is a perspective view of another exemplary embodiment of a tool holder.

Although the exemplary embodiment shows two circumferential portions of different heights, there may be more than two different circumferential portions of different heights. For example, there may be three, four, five, six or more circumferential portions, each with different heights. This would allow for accommodation of a wider variety of hex key sizes. Additionally, rather than being stepped, and having discrete different heights, the circumferential portion of the opening 141 may be angled, as is shown in FIGS. 9 and 10. In this instance, the height of the circumferential portion is of variable height throughout the angled portion.

Depending upon the size of the hex key, the hex key will rotate relative to the sleeve 140 when the tool holder 130 begins to be turned by the screwdriver. For example, in the case of a hex key that is 5 mm in diameter, the hex key is wider than the height of the first circumferential portion 142 (which has a height of 4 mm in the exemplary embodiment). In this instance, the 5 mm hex key will contact the sides of the opening 146 and remain aligned with the opening 146 as torque is transmitted from the tool holder 130 to the hex key. This is shown in FIG. 5 in which the hex key 125 remains aligned with the opening 146.

FIG. 7 illustrates a hex key 126 that has a diameter of 3 mm. With the hex key 126 of FIG. 7, when the tool holder is rotated and the hex key 126 is engaged with a fastener, the torque on the hex key 126 will initially cause the hex key 126 to rotate relative to the sleeve 140. It will rotate out of the opening portion 146 because the hex key 126 is shorter than the bottom of the walls 145 of the opening portion 146. Additionally, it rotates past the first circumferential portion 142 because the hex key 126 is shorter than the height of that portion. Ultimately, the hex key 126 sits in the second circumferential portion 143 abutting the end wall of the second circumferential portion 143. This is the position shown in FIG. 7. The hex key 126 is positioned against the left-hand most side of the opening 141, which is for driving the hex key 126 when the tool holder 130 is rotating in a counter-clockwise direction. When the tool holder 130 is driven in the opposite direction (the clockwise direction), the hex key 126 would fit into the second circumferential portion on the opposite side (i.e., the right-hand most position). Although the hex key 126 will be driven to these positions when the tool holder 130 is driven, the user may also place the hex key 126 in the appropriate position for driving.

FIG. 8 illustrates the tool holder 130 in the hex bit holder 30 of the screwdriver 10. A screwdriver bit 26 is fit into the tool holder 130. Accordingly, in FIG. 8, the screwdriver 10 can drive the tool holder 130, which in turn drives bit 26 to screw in or remove a fastener. FIG. 9 similarly illustrates the tool holder 130 connected to the screwdriver, but holding a hex key 127. Accordingly, in FIG. 9, the tool holder 130 is position so as to drive a fastener via the hex key 127.

The hex keys may be placed in a more than one position. For example, the hex key 125 in FIG. 5 is position so that the long leg of the hex key 125 projects forward from the tool holder 130 and the short leg of the hex key 125 extends to the side. The long leg projecting forwardly is driven rotationally about the axis of the tool holder 130 in order to drive a fastener in this instance. The hex key 126 of FIG. 7 is shown in the opposite position. In FIG. 7, the long leg of the hex key 126 projects out of the side of the sleeve 140 and the short leg projects forwardly. Thus, in FIG. 7, the short leg is rotated to drive a fastener to which it is engaged.

FIG. 9 illustrates a hex key 127 with two bends. Accordingly, there is no short and long leg. Each of the two ends which may engage and drive a fastener are of a similar length, and they are connected by a longer connecting leg. In any event, either of the two shorter legs may be placed in the retainer 133 so that it may be used to drive a fastener.

Figure 11:
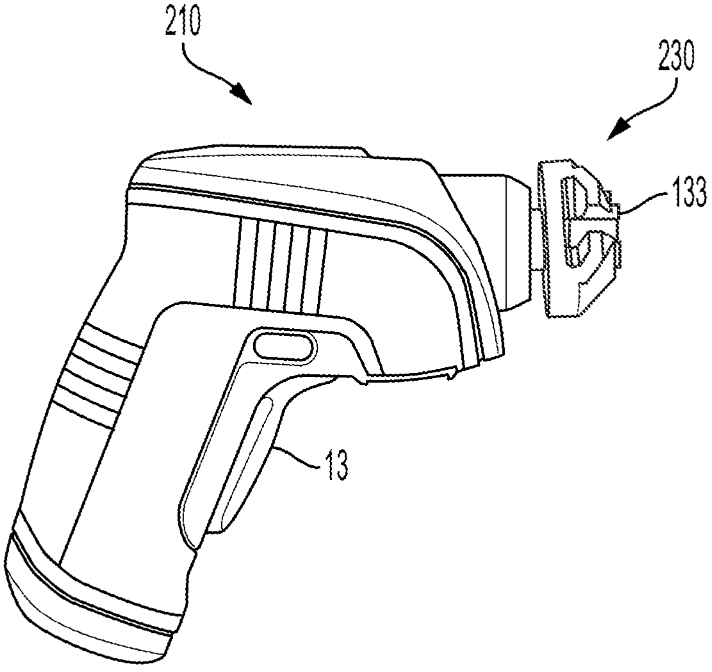
FIG. 11 is a side view of a screwdriver including the exemplary embodiment of the tool holder shown in FIG. 10.
Figure 13:
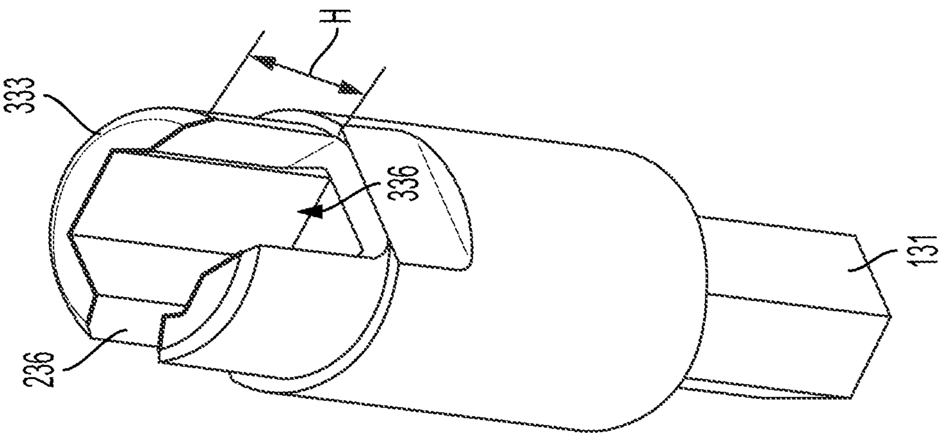
FIG. 13 is a perspective of a portion of the exemplary embodiment of the tool holder.

In the embodiment of FIGS. 4-9, the tool holder 130 is an accessory which may be attached to a conventional hex bit holder 30 of a screwdriver. It should be understood, however, that the tool holder 130 may be made integral with a powered screwdriver. For example, the exemplary embodiment of FIGS. 10 and 11 illustrate a tool holder 230 which is integral with a screwdriver 210. The tool holder 230 is the same as the tool holder 130 unless otherwise noted and the screwdriver 210 is the same as the screwdriver 10 unless otherwise noted.

As shown in FIG. 11, the screwdriver 210 has the tool holder 230 in place of the conventional hex bit holder 30. Instead of being an accessory that can be attached to a hex bit holder, the tool holder 230 is integrated into the screwdriver 210. As shown in FIG. 10, the tool holder 230 includes a shaft 231. The shaft 231 is directly driven by a transmission 50 (FIG. 2). In the event that a screwdriver lacked a transmission, the shaft 231 may be driven directly by the motor 20.

The tool holder 230 has a retainer 133 in the same manner as the tool holder 130. However, as alluded to previously, the sleeve 240 of the tool holder 230 is slightly different than sleeve 140. The sleeve 240 has an opening 246 which is aligned with the opening 136 of the retainer 133. However, the opening 241 is different. In particular, the first circumferential opening portion 242 has a flat and consistent height. Then, the second circumferential opening 243 has an angled top surface such that the section has a continuously variable height. The continuously variable height of the second circumferential opening 243 will accommodate hex keys of various diameters. The opening 241 also has ends 244, as is the case with the opening 141.

While the tool holder 230 is integrated into a screwdriver 210, as shown in FIG. 11, it could alternatively be made as an accessory, similar to the tool holder 130. Accordingly, both the tool holder 130 and the tool holder 230 may be either integral with a screwdriver or as an accessory. This is true for the various tool holder embodiments discussed herein unless otherwise noted. Additionally, features from the various tool holders may be integrated into one another. For example, the tool holder 130 may be made with a continuously variable opening section rather than stepped sections, or the tool holder may have a continuously variable section in addition to stepped sections.

FIG. 12-15 illustrate another exemplary embodiment of a tool holder 330. The tool holder 330 has two openings. Particularly, the retainer 333 has a first opening 236 and a second opening 336. The sleeve 340 has a first opening 241 which corresponds to the opening 236. The sleeve 340 also has a second opening 341 which corresponds to the second opening 336. The first opening 236/241 is smaller (i.e., more narrow) than the second opening 336/341. For example, the first opening 236 may be 4 mm wide and the second opening 336 may be 5 mm wide. The different sized openings may accommodate hex keys of different sizes. In the exemplary embodiment, there are two magnets 338 in the opening 342. The various sleeve openings of the various exemplary embodiments may have no magnets, or one, two or more magnets.

Figure 12:
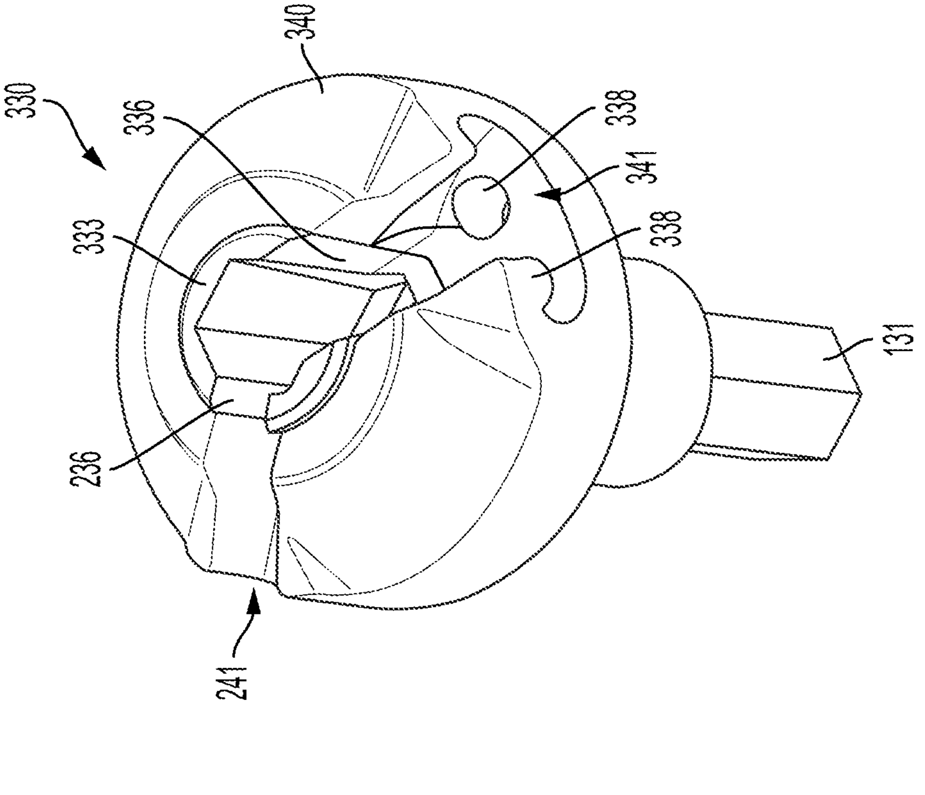
FIG. 12 is a perspective of another exemplary embodiment of a tool holder.
Figure 15:
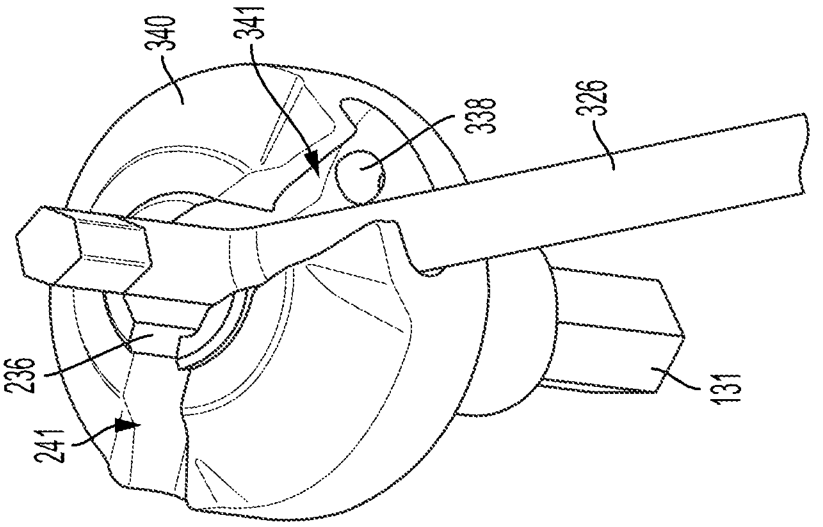
FIG. 15 is another perspective of the exemplary embodiment of the tool holder
Figure 14:
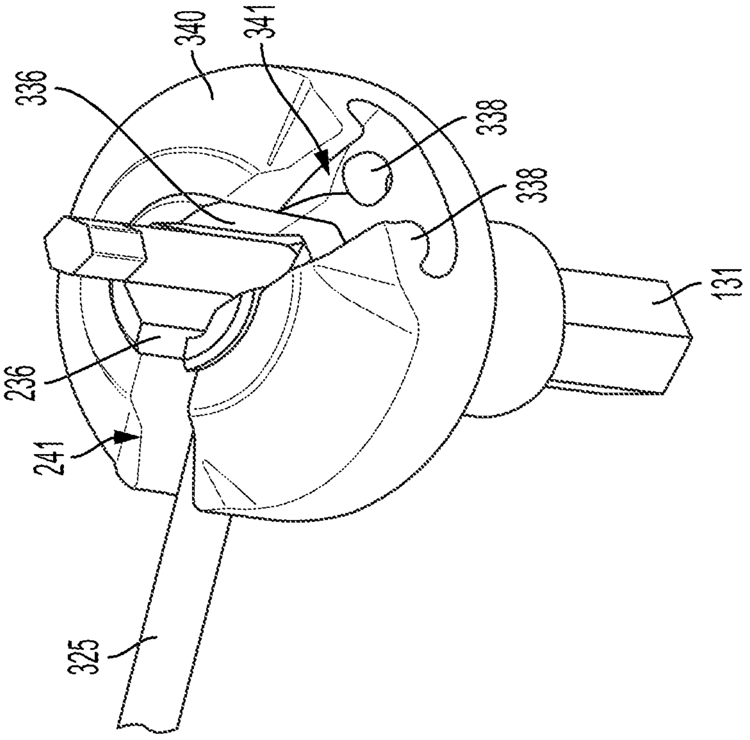
FIG. 14 is another perspective of the exemplary embodiment of the tool holder.

Each of the sleeve openings 241 and 341 have a circumferential portion. The circumferential portion 342 of the opening 341 is shown in FIGS. 12, 14 and 15. The sleeve opening 241 circumferential portion is hidden in the view, but is similarly constructed to the circumferential portion 342 but has a different height, the circumferential portion 342 having a greater height than the circumferential portion for the sleeve opening 241. This allows for a larger hex key to be accommodated in the openings 336/341 than at the opening 236/241. In the exemplary embodiment, the circumferential portion does not have steps or an angled portion to provide a variable height. Instead, the two different openings accommodate for the different sized hex keys. Of course, the stepped or angled circumferential portions of the previous embodiments may be used in order to provide for more hex keys.

FIG. 14 illustrates a hex key 325 disposed in the opening 236/241 so that the hex key 325 can be driven to drive a fastener. FIG. 15 illustrates a larger hex key 326 disposed in the opening 336/341 so that the hex key 236 may be driven to drive a fastener with the hex key 236. As with the prior embodiments, the tool holder 330 may be an accessory or may be integrated into a screwdriver.

FIGS. 16-25 illustrate another exemplary embodiment of a tool holder. As will be explained in further detail below, the tool holder 430 includes a rotary lock to secure hex keys. As with the previous exemplary embodiments of tool holders, the tool holder 430 may hold either a hex bit or a hex key, providing flexibility to the user. In this exemplary embodiment, the tool holder 430 secures the hex key with a rotary lock.

Figure 17:
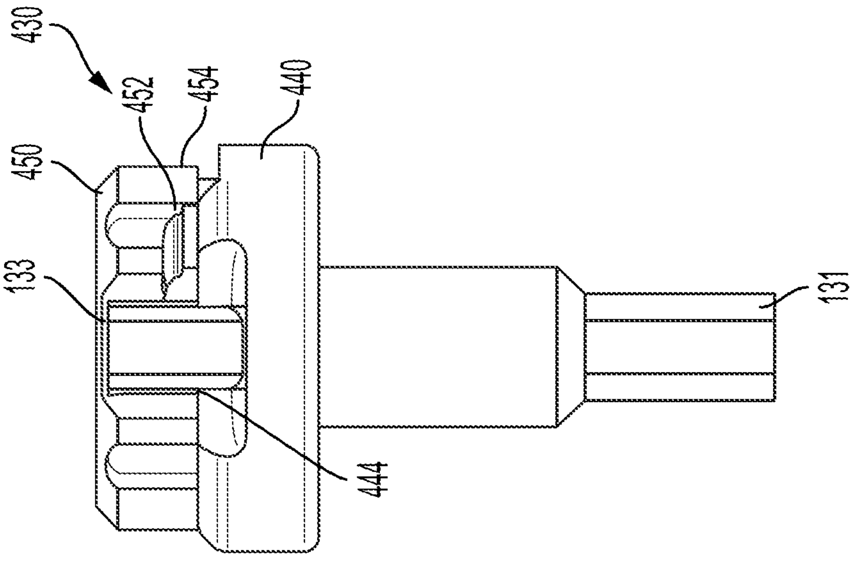
FIG. 17 is a side view of the exemplary embodiment of a tool holder of FIG. 16.
Figure 16:
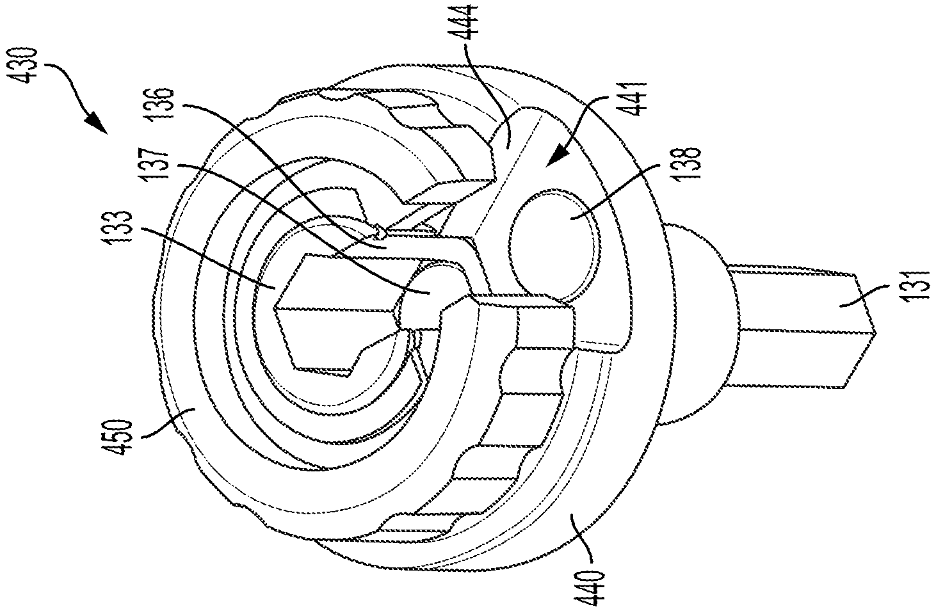
FIG. 16 is a perspective of another exemplary embodiment of a tool holder.
Figure 19:
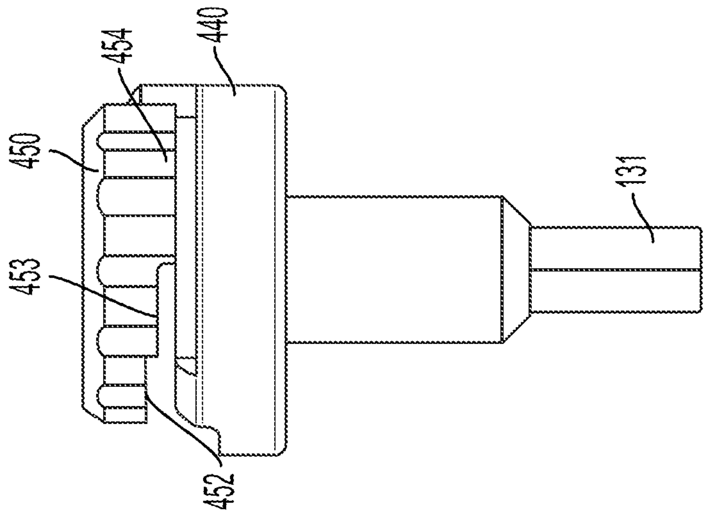
FIG. 19 is another side view of the exemplary embodiment of the tool holder.
Figure 18:
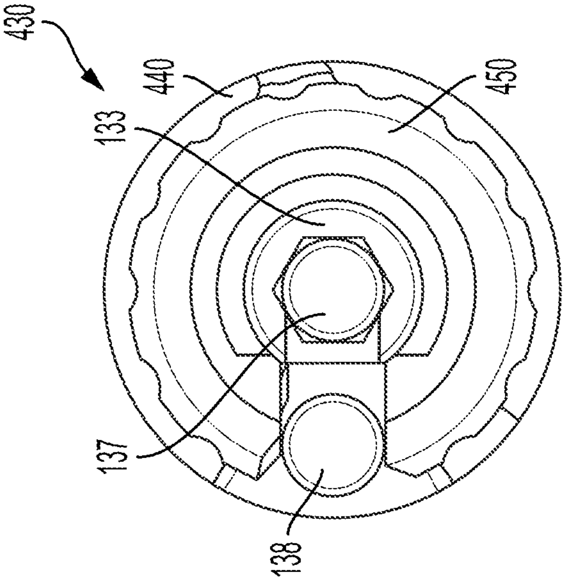
FIG. 18 is a top view of the exemplary embodiment of the tool holder.

FIG. 16 is a perspective view of the tool holder 430 and FIG. 17 is a side view of the tool holder 430. FIG. 18 is a top view and FIG. 19 is a side view of the tool holder 430. As shown in FIGS. 16-19, the tool holder 430 has a hexagonal insertion portion 131 which may be inserted into a hexagonal bit holder 30. As mentioned above, the tool holder 430 may instead be adapted to be integral to a screwdriver and driven directly by the transmission rather than through a hexagonal bit holder.

As further shown in FIGS. 16 and 17, the tool holder 430 includes an inner retainer 133, in the same manner as tool holder 130. As previously discussed, the inner retainer retains standard hexagonal bits, such as screwdriver bits and hexagonal drill bits. Accordingly, the tool holder 430 may hold standard hexagonal bits in the manner previously described. Furthermore, the inner retainer 133 includes an opening 136 to allow hex keys to project outwardly to the side. As shown in FIGS. 16 and 18, the tool holder 430 includes magnets 137 and 138.

Figure 22:
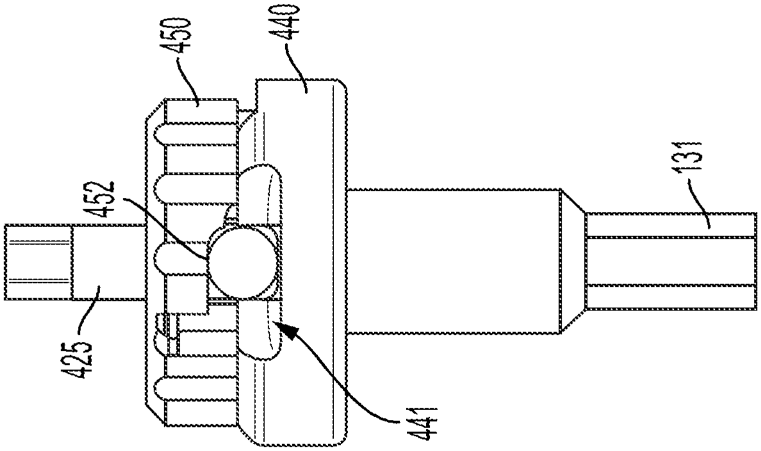
FIG. 22 is another side view of the exemplary embodiment of the tool holder.
Figure 24:
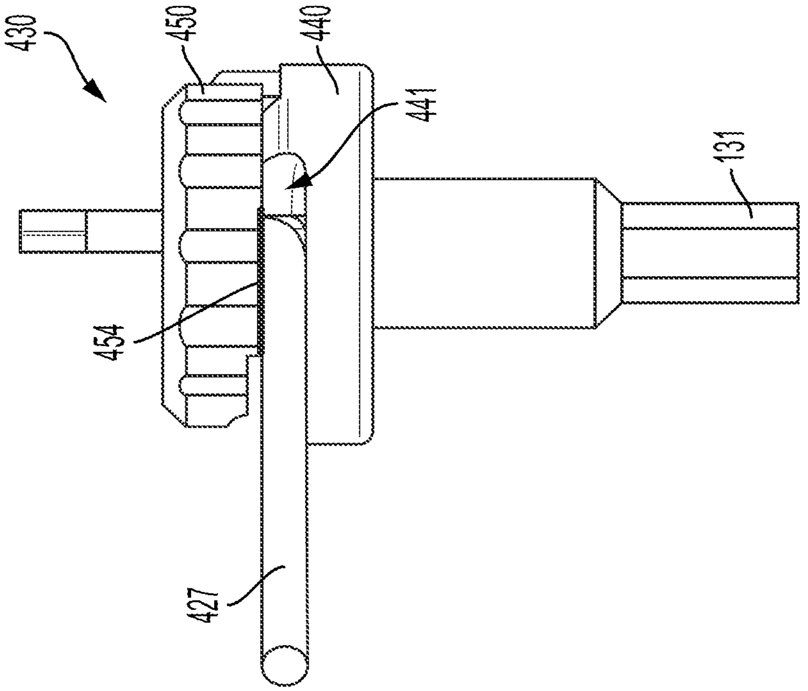
FIG. 24 is another side view of the exemplary embodiment of the tool holder.
Figure 23:
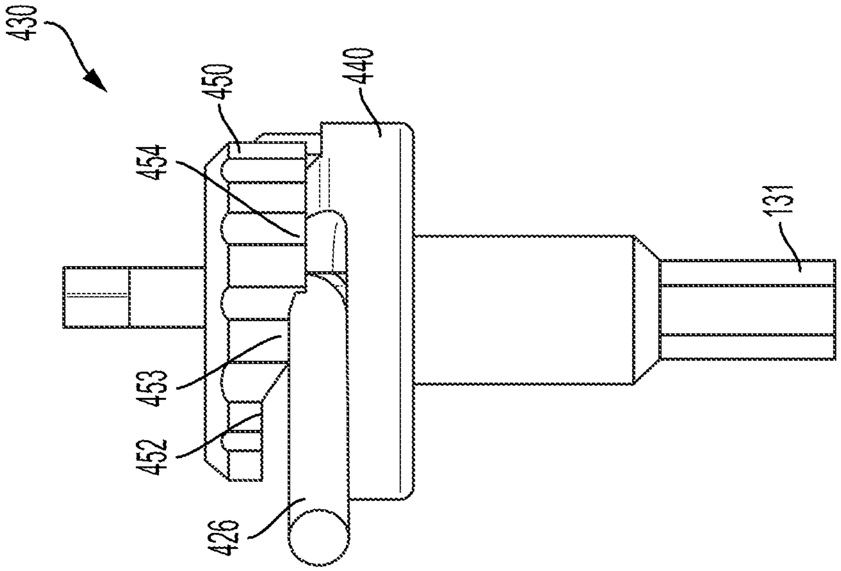
FIG. 23 is another side view of the exemplary embodiment of the tool holder.

The tool holder 430 includes a sleeve 440. The sleeve 440 has an opening 441. The opening 441 has a selectively open upper end 444, as shown in the various figures. The sleeve 440 also includes a lock 450. The lock 450 is a rotary lock, which selectively rotates to close the open end 444. For example, the rotary lock 450 is shown in an open position in FIGS. 16, 17 and 21. In this position, an opening 451 in the rotary lock 450 is aligned with the opening 136. As shown in FIGS. 22-24, the rotary lock 450 may be rotated in the clockwise direction to various states of closed positions. FIG. 22 illustrates the rotary lock 450 rotated clockwise from the open position shown in FIG. 21 to a closed position. FIG. 23 shows the rotary lock 450 rotated further clockwise as compared to FIG. 22. FIG. 24 illustrates the rotary lock 450 rotated even further clockwise as compared to FIG. 23 to the fullest extent possible.

Figure 20:
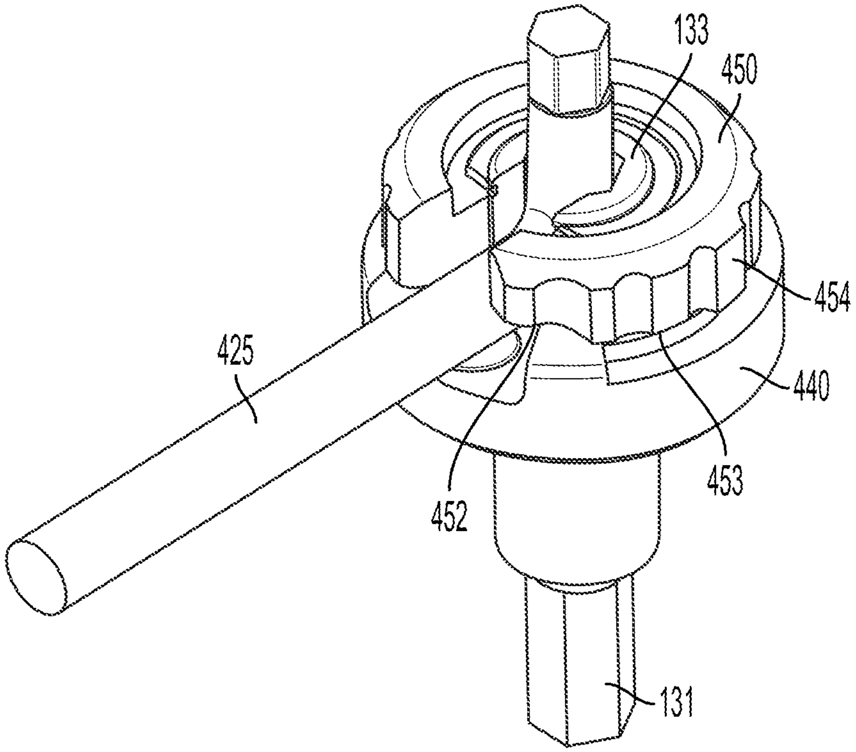
FIG. 20 is another perspective view of the exemplary embodiment of the tool holder.
Figure 21:
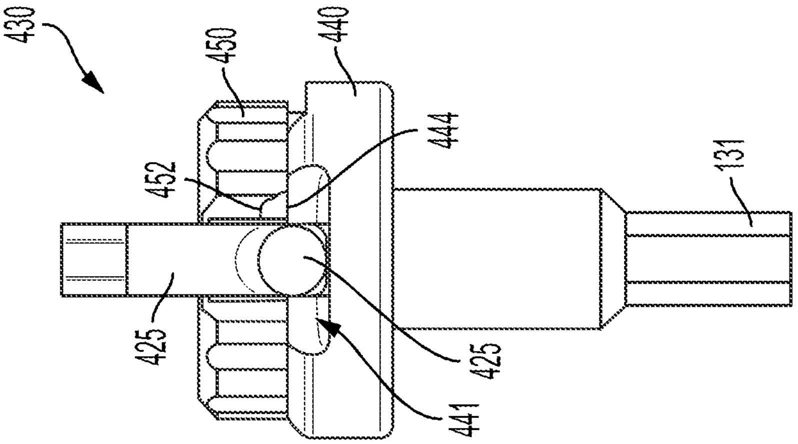
FIG. 21 is another side view of the exemplary embodiment of the tool holder.

Operation of the tool holder 430 for holding hex keys with the rotary lock 450 is illustrated in FIGS. 20-24. FIG. 20 is a perspective view of the tool holder 430 with the rotary lock 450 in the open position and a hex key 425 inserted therein. The hex key 425 may have a diameter of 5 mm. As can be seen in FIG. 20, a leg of the hex key 425 projects out of the side of the tool holder, through the opening 136. FIG. 21 illustrates the tool holder 430 and hex key 425 with the rotary lock 450 in the same, open, position. As will be appreciated, when the rotary lock 450 is in this open position, the user may place the hex key 425 into the tool holder 430 and may likewise remove the hex key 425 from the tool holder. One or more magnets may resist removal to some extent, but that force is of a degree that may be readily overcome by a user. The hex key 425 may also fall out of the tool holder 430 if a user tries to drive a fastener with the hex key 425.

FIG. 22 illustrates a side view of the tool holder 430 with the rotary lock 450 rotated clockwise from the open position to a first closed position. In this position, the rotary lock 450 overlaps the hex key 425 so that the hex key is secured the tool holder 430. As shown in FIG. 22, the rotary lock 450 has a first recess 452 into which the hex key 425 fits. The first recess 452 can also be seen in, for example, FIG. 17. Essentially, the surface of the rotary lock 450 facing the sleeve 440 does not extend as far at the first recess 452 as it does around the majority of the rotary lock 450.

FIG. 23 illustrates the tool holder 430 securing a different hex key 426. The hex key 426 has a smaller diameter than the hex key 425. In particular, in the exemplary embodiment, the hex key 426 may have a diameter of 4 mm. As discussed previously, in FIG. 23 the lock 450 is rotated further clockwise as compared to the position of FIG. 22. As shown in FIG. 23, the hex key 426 fits into a second recess 453 in the lock 450. The second recess 453 of the lock 450 provides a smaller height clearance than the first recess 452. Accordingly, it secures the hex key 426 with a smaller diameter than the hex key 426.

FIG. 24 illustrates the tool holder 430 securing a different hex key 427. The hex key 427 has a smaller diameter than the hex key 427. In particular, in the exemplary embodiment, the hex key 427 may have a diameter of 3 mm. As discussed previously, in FIG. 24 the lock 450 is rotated further clockwise as compared to the position of FIG. 23. As shown in FIG. 24, the hex key 427 contacts a rear surface 454 of the lock 450. The rear surface 454 is the surface facing the sleeve 440 (the insertion portion 131 defining a rear of the tool holder 430 and the retainer 133 being at a front end). The rear surface 454 provides smaller height clearance than either the first recess 452 or the second recess 453, as the rear surface 454 is the absence of such recesses. Accordingly, the rear surface 454 of the lock 450 secures the hex key 427 that has the smallest diameter among the hex keys 425, 426 and 427. In that manner, hex keys of various sizes may be secured in the tool holder 430.

While the exemplary embodiment describes two recesses in the lock 450 so as to accommodate three different hex key diameters, there may be a greater or fewer number of recesses to accommodate a different number of hex keys. For example, there may be a third recess which accommodates a hex key with a diameter of 6 mm. In other embodiments, there may additionally be a fourth or fifth recess. Additionally, projections may be used in order to accommodate hex keys. For example, there may additionally be a projection which extends rearwardly from the rear surface 454 to create an opening to accommodate a hex key of 2 mm. Projections and recesses of varying numbers may be used together in an embodiment.

Rather than having specific recessed portions, as is shown in FIGS. 21-24, the surface of the lock 450 which engages the hex keys may simply be angled, providing continuously variable heights.

In the exemplary embodiment, the recesses provide openings with heights substantially the same as the hex key diameters. That is, the recess 452 provides a clearance with the sleeve 440 of substantially 5 mm to accommodate a hex key of approximately 5 mm. There is then a transition to the recess 453 of 4 mm, and the hex key of 5 mm cannot pass the transition portion.

Figure 26:
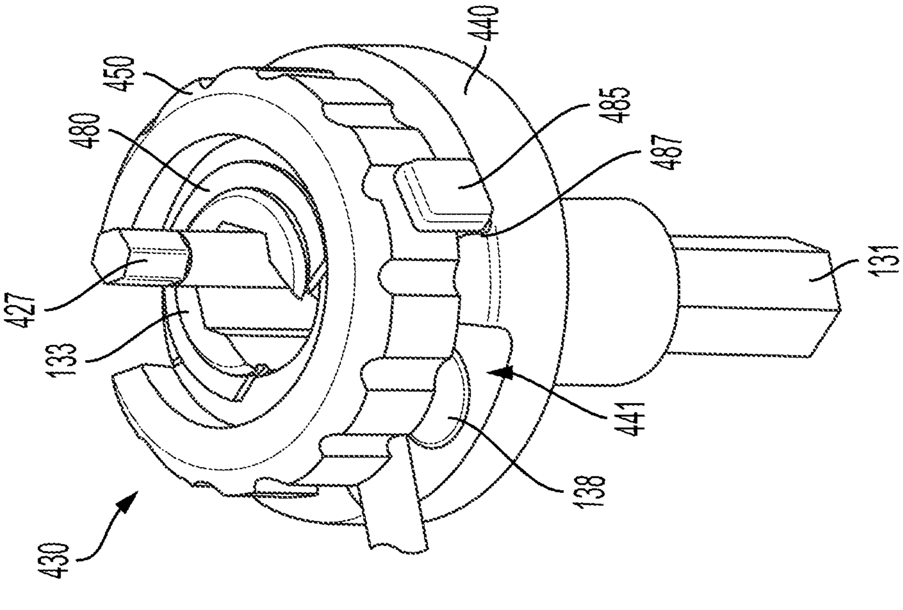
FIG. 26 is another perspective view of the exemplary embodiment of the tool holder.
Figure 25:
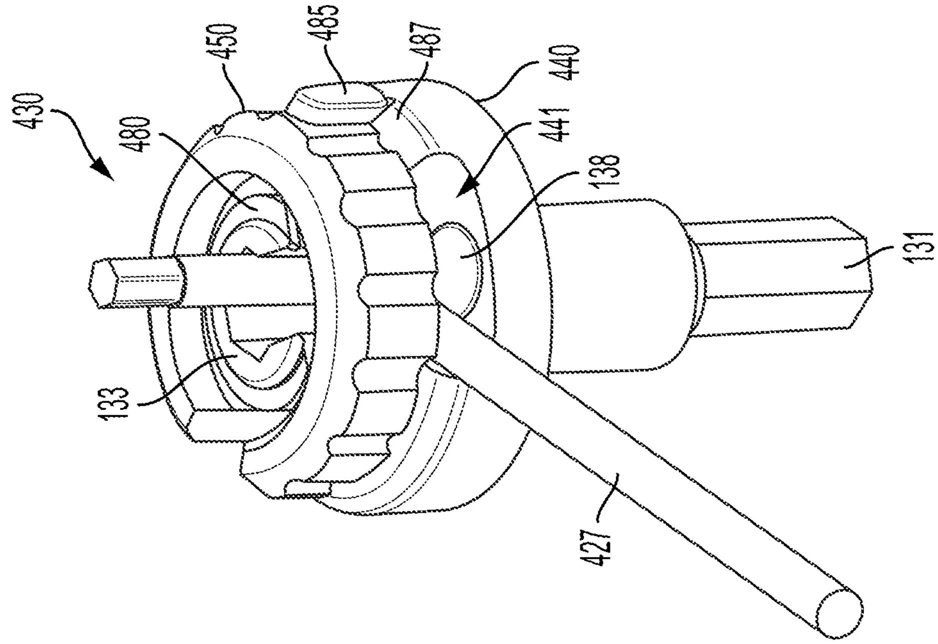
FIG. 25 is another perspective view of the exemplary embodiment of the tool holder.
Figure 27:
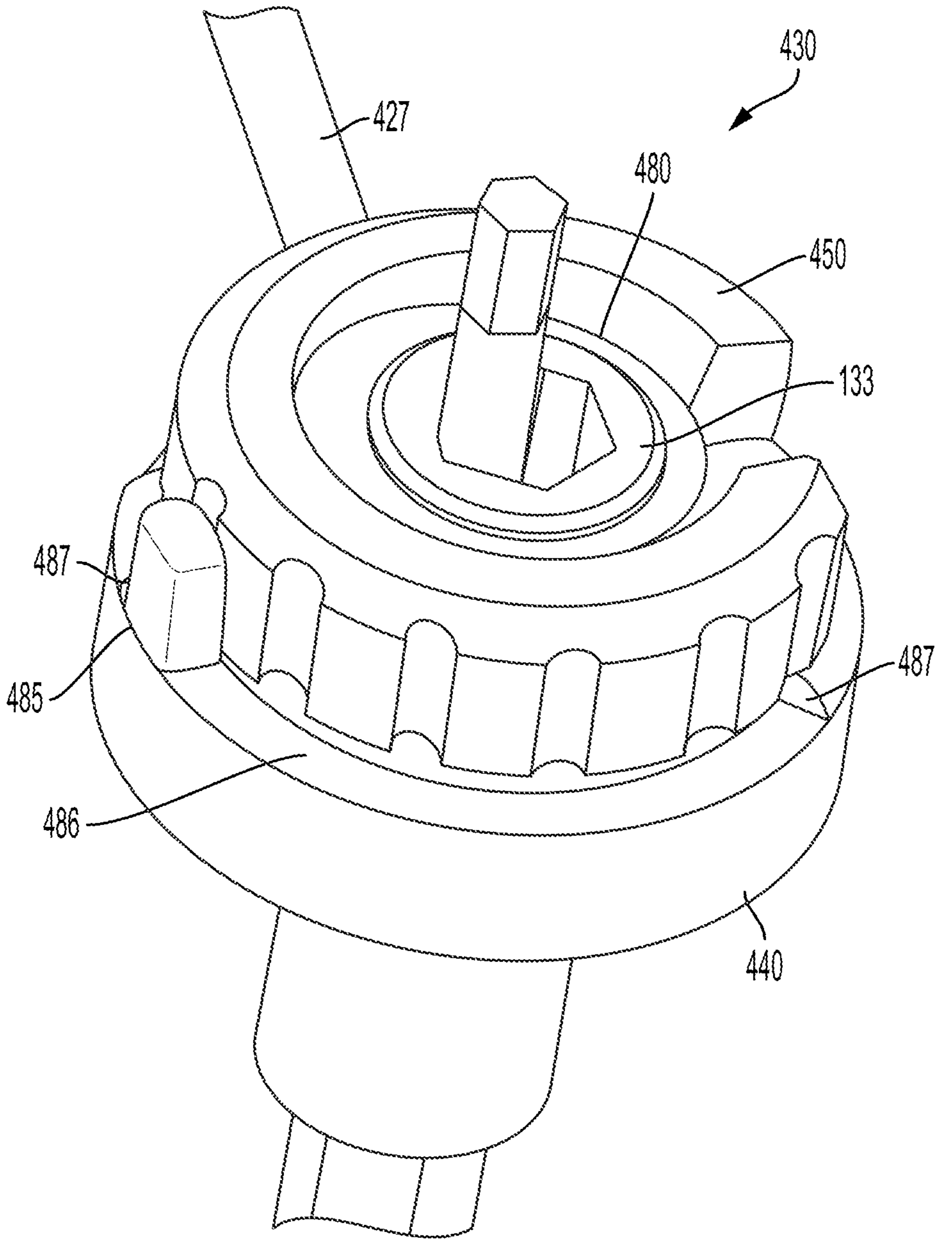
FIG. 27 is another perspective view of the exemplary embodiment of the tool holder.

FIGS. 25-27 illustrate additional views of the tool holder 430. FIGS. 25 and 26 are perspective views, and FIG. 27 is a close-up perspective view. In each of FIGS. 25-27, the tool holder 430 is holding the 3 mm hex key 427. As shown, the hex key 427 is held between the sleeve 440 and the rear surface 454 of the lock 450.

Figure 28A:
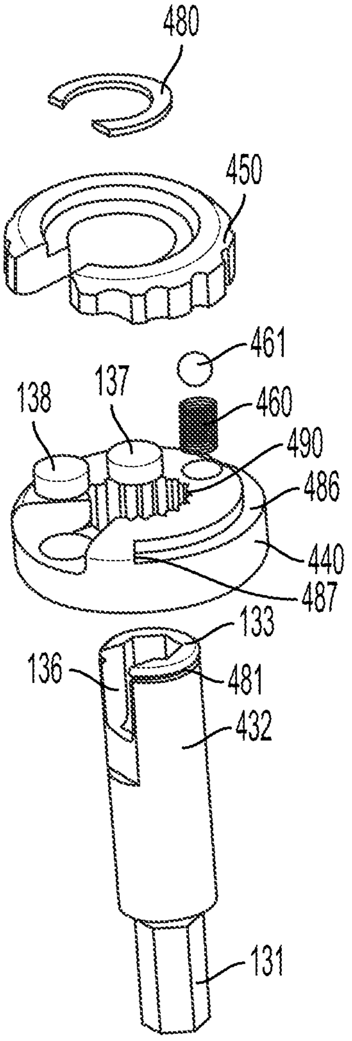
FIG. 28A is an exploded view of the exemplary embodiment of the tool holder.
Figure 28B:
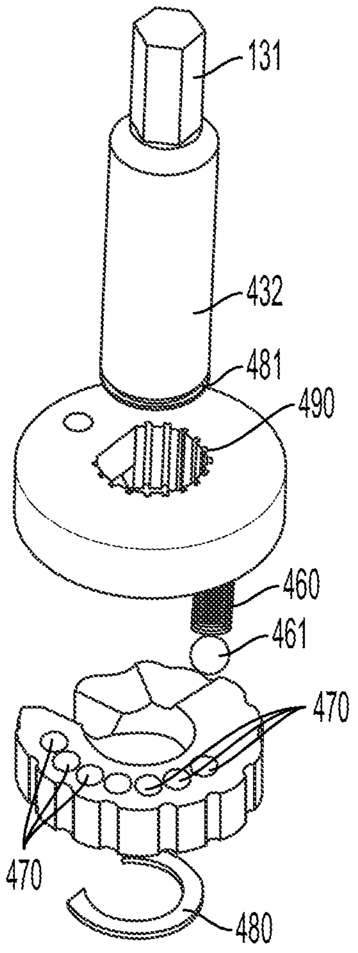
FIG. 28B is another exploded view of the exemplary embodiment of the tool holder.
Figure 29B:
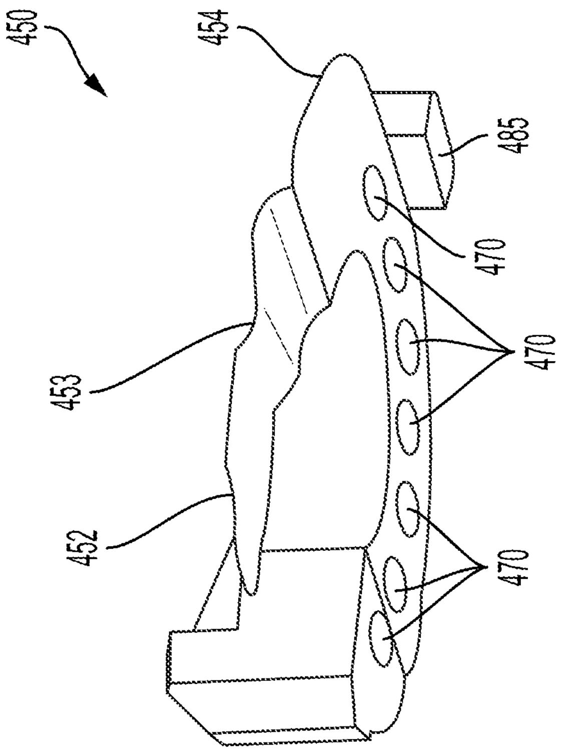
FIG. 29B is a perspective view of a lock of the exemplary embodiment of the tool holder.
Figure 29A:
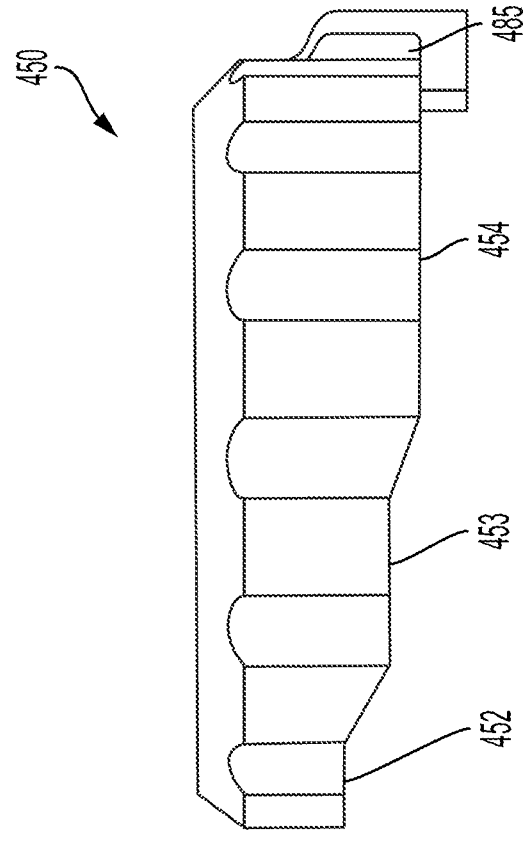
FIG. 29A is a side view of a lock of the exemplary embodiment of the tool holder.
Figure 30:
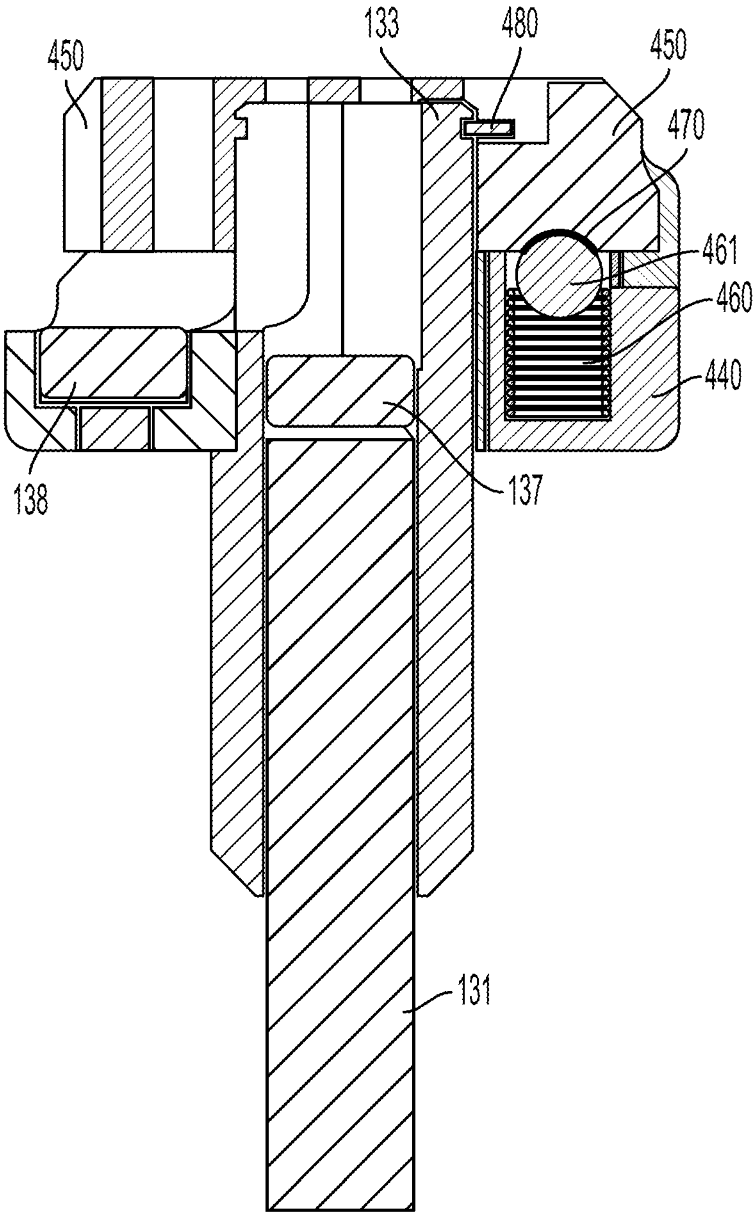
FIG. 30 is a cut-away side view of the exemplary embodiment of the tool holder.

FIGS. 28A and 28B are exploded views of the tool holder 430. FIG. 29A is a side view of the lock 450 and FIG. 29B is a perspective view of the lock 450. FIG. 30 is a cross-sectional view showing the tool holder 430.

As shown in FIGS. 28A and 28B, in addition to the previously described parts, the tool holder 430 includes a spring 460 that biases a ball bearing 461 into a series of detent recesses 470. The detent recesses 470 are shown in FIG. 28B and are formed on a rear surface of the lock 450. This allows the lock 450 to be rotated into a number of distinct and defined positions. In the exemplary embodiment there are seven detents 470 providing for seven positions for the lock 450. In other embodiments there may be a greater or lesser number of detents recesses 470. Additionally, the sleeve 440 includes a grooved inner surface 490. The inner surface 490 provides a frictional and keyed fit onto a shaft 432 between the insertion end 131 and the retainer 133. Additionally, the tool holder 430 includes a retaining ring 480. The retaining ring 480 fits on an end near the end of the retainer 133 to hold the assembly together by snapping into a groove 481 at the retainer end 133. The retaining ring 480 extends outwardly to prevent the lock 450 and sleeve 440 from moving axially forwardly.

Additionally, FIGS. 27 through 30 illustrate structure for rotation of the lock 450 relative to the sleeve 440. As shown, the sleeve 440 includes a groove 486. The groove 486 has two ends 487. The lock 450 includes a stop 485. The stop 485 can travel in the groove 486 between the two ends 487, at which the stop 485 hits the ends 487 and can rotate no further. That is, the ends 487 of the groove 486 delimit the range of rotation of the lock 450.

Figure 31:
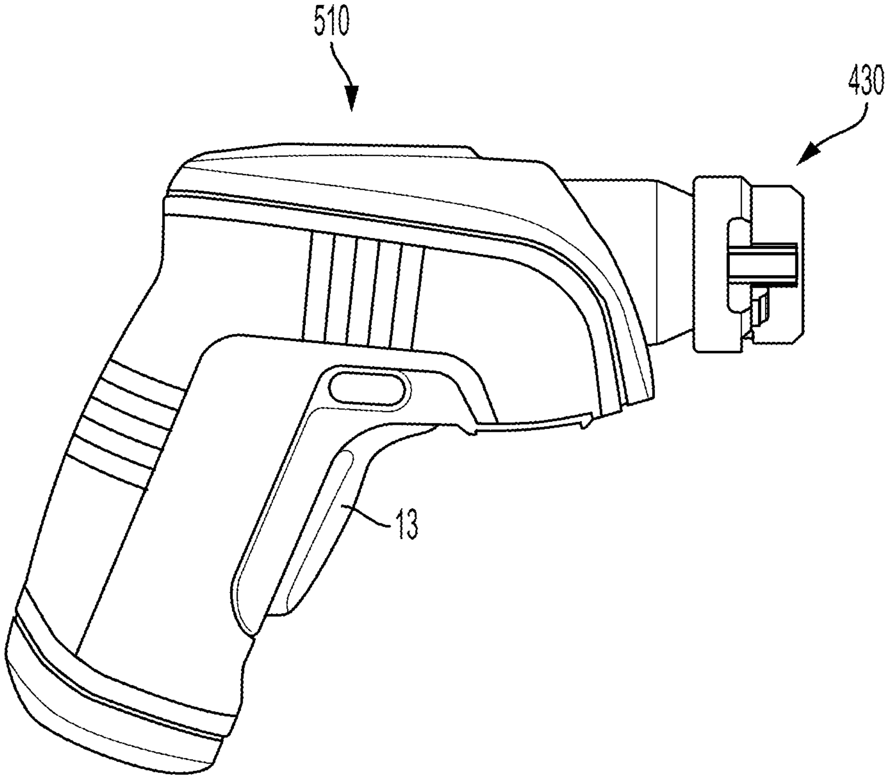
FIG. 31 is side view of a screwdriver including the exemplary embodiment of the tool holder.

As discussed previously, the tool holder 430 may be made as an accessory which can fit into a standard hex bit holder or may be integrated into a screwdriver. FIG. 31 shows the tool holder 430 integrated into screwdriver 510.

The various hex keys may differ in their construction. For example, the hex keys may have a hexagonal cross section throughout or the hex keys may have hexagonal ends for connecting to fasteners, but a circular cross-sectional portion between the two ends. Additionally, each end of the hex keys may be the same, or each end of the hex key may be different so as to drive different fasteners. For example, one end of a hex key may have a different hex shaped size than the opposite end. In other embodiments, one or both ends of the key may have a flathead or other screwdriver shape rather than a hex shape.

Figure 32:
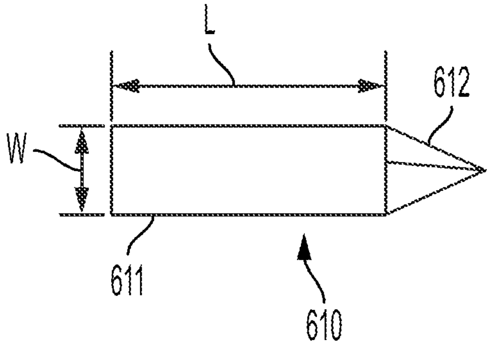
FIG. 32 is a schematic side view of a bit.
Figure 33:
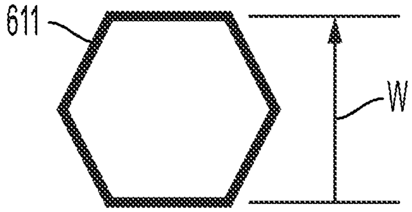
FIG. 33 is a cross-sectional schematic view of the bit.

One benefit of exemplary embodiments of the present application are that they can hold hexagonal screwdriver bits with a relatively short lengths. FIGS. 32 and 33 illustrate a screwdriver bit 610. FIG. 32 is a side view of the screwdriver bit 610. The screwdriver bit 610 has a hexagonal section 611 and a driving head 612. The driving head may be any of a number of screwdriver shapes and types, such as flat head, cross-head, Phillips, star shaped, Torx or other configurations, as is well known in the art, to drive a variety of fasteners. The hexagonal section 611 has a cross section shape of a hexagon, as is shown in FIG. 33. The length L of the hexagonal section may commonly be about ½" (0.5 inches) and the width W may be about ¼" (0.25 inches). The retainers 133 and 333 of the exemplary embodiments are sufficiently shallow so that such a fastener may be held by the tool holders 130, 230, 330 and 430 with the driving head 611 projecting from the retainer 133, 333 so that it can effectively drive a fastener.

In an exemplary embodiment, the retainers 133, 333 may have an axial length of approximately ¼" so that it effectively holds a screwdriver bit with a hexagonal section of about ½" in length L. However, the retainers 133 and 333 may have an axial length H (FIGS. 6 and 14) among a wide variety of ranges, such as of ¾" or less (0.75 inches); ⅝" or less; ½" or less; ⅜" or less; 5/16" or less; ¼" or less; 3/16" or less; ⅛" or less; or 1/16" or less. It can be advantageous to size the retainer 133/333 as having an axial length H of a sufficiently small size so as to be able to hold and retain short screwdriver bits while maintaining the driving head extending from the retainer 133/333 so as to allow it to drive a fastener. Accordingly, in various embodiments the retainers 133/333, and thus the tool holders 130, 230, 330 and 430 can be sized to hold screwdriver bits with a hexagonal section with a length L of about ¾" or less (0.75 inches); ⅝" or less; ½" or less; ⅜" or less; 5/16" or less; ¼" or less; 3/16" or less; ⅛" or less; or 1/16" or less.

As is understood, a user can insert and remove the various hex keys and bit holders. Additionally, the user can drive fasteners with each of the hex keys and bit holders. Accordingly, it is contemplated that the present exemplary embodiment includes the method of inserting, securing and using the various hex keys and bit holders.

FIGS. 34-47 illustrate another exemplary embodiment of a tool holder 730. The tool holder 730 is designed to hold hex keys of various sizes. It may also hold a hex screwdriver bit, such as bit 610 or 25.

Figure 35:
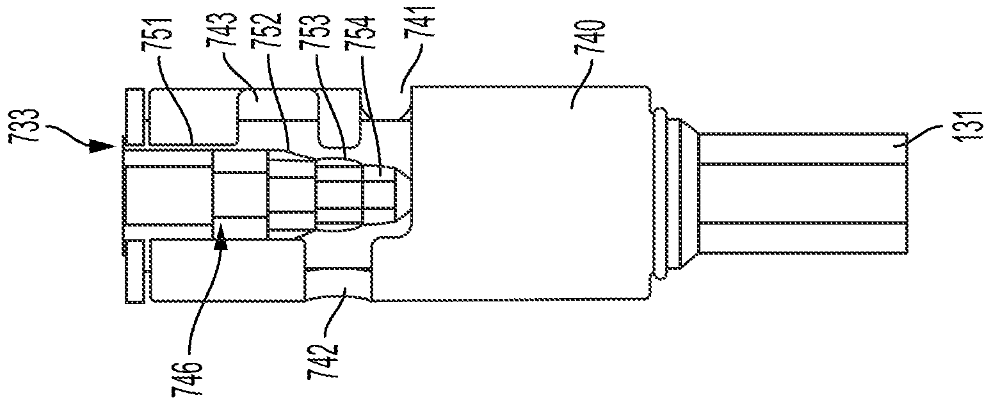
FIG. 35 is a side view of the exemplary embodiment of the tool holder.
Figure 34:
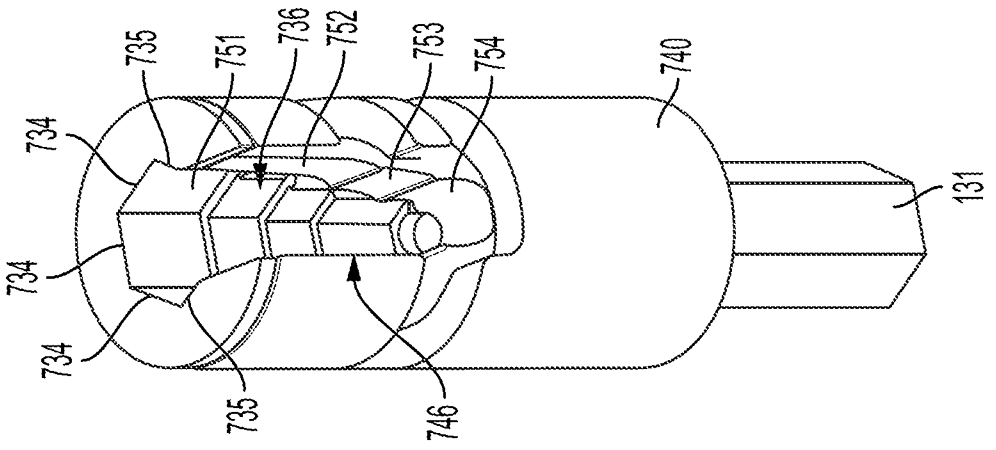
FIG. 34 is a perspective view of another exemplary embodiment of a tool holder.
Figure 47:
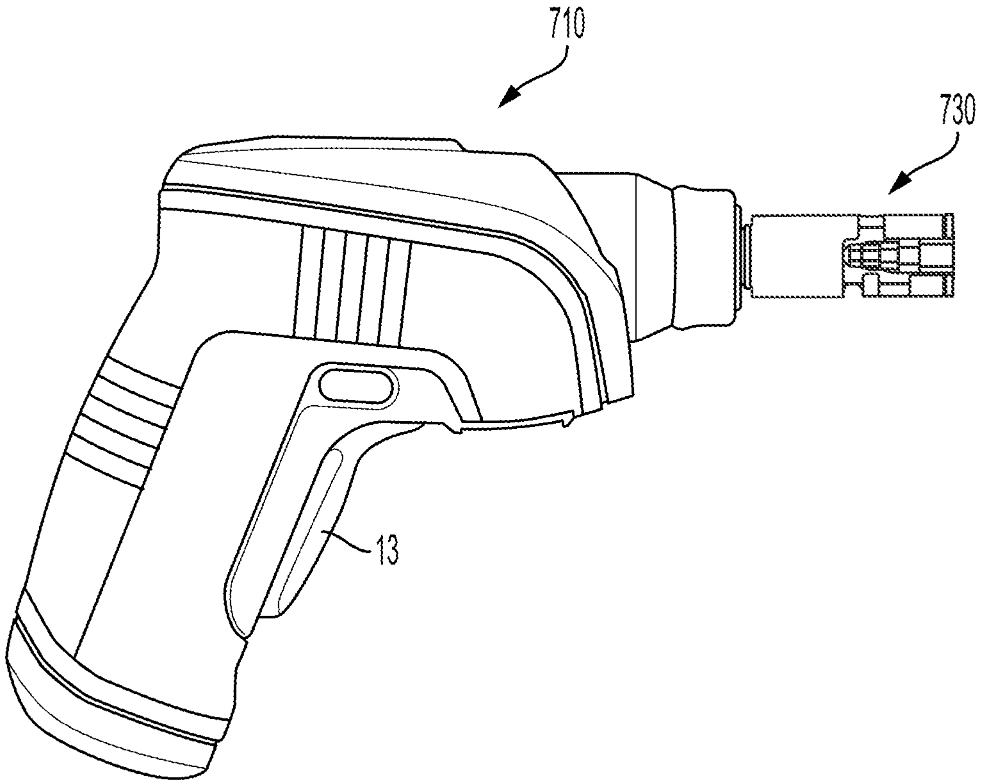
FIG. 47 is a side view of a screwdriver with the exemplary embodiment of the tool holder.

As shown in FIGS. 34 and 35, the tool holder 730 includes an insertion portion 131. As has previously been discussed, the insertion portion 131 may be inserted into a standard hex bit holder, such as hex bit holder 30. Also, as with previous exemplary tool holder embodiments, the tool holder 730 may be made integral with a screwdriver such the insertion portion 131 is replaced with a shaft and is driven directly by the motor or transmission of the screwdriver, rather than through a hex bit holder. For example, FIG. 47 illustrates a screwdriver 710 which incorporates the tool holder 730 directly into the screwdriver 710. In any event, as with previous tool holder embodiments, the tool holder 730 may either be made as an accessory or integrated directly into a powered tool, such as a screwdriver.

The tool holder 730 has a stepped retainer 733. As with the retainer 133, the stepped retainer 733 is partially hexagonally shaped. The partial hexagon has three full sides 734 and two partial sides 735. Additionally, the stepped retainer 733 includes a side opening 733 so that the hexagon shape is not closed. As will be appreciated, a front of the retainer is open and a tool such as a bit can project out of the front to drive a fastener.

The stepped retainer 733 has the partial hexagonal shape in four different sizes. In particular, the stepped retainer 733 has four sections 751, 752, 753 and 754. The section 751 is the largest and closest to the front of the tool holder 730. The sections then get increasingly smaller such that section 752 is smaller than section 751; section 753 is smaller than section 752 and section 754 is smaller than section 753. Section 754 is the farthest rearward section.

A distance from one of the full sides 743 to a partial side 735 opposite to the full side may be 6 mm for the section 751; 5 mm for the section 752; 4 mm for the section 753 and 3 mm for the section 754. These dimensions may also be made slightly more such as slightly more than 6 mm, slightly more than 5 mm, etc., so that they more easily accommodate hex keys of 6 mm, 5 mm etc. That is, the 5 mm stepped section 752 can be sized to accommodate a hex key with a diameter of approximately 5 mm. Accordingly, the stepped section can be 5 mm or slightly larger. As will be appreciated, there could be more or less than four different stepped retainer sections, and the sizes may be different than those in the exemplary embodiment.

Figure 40:
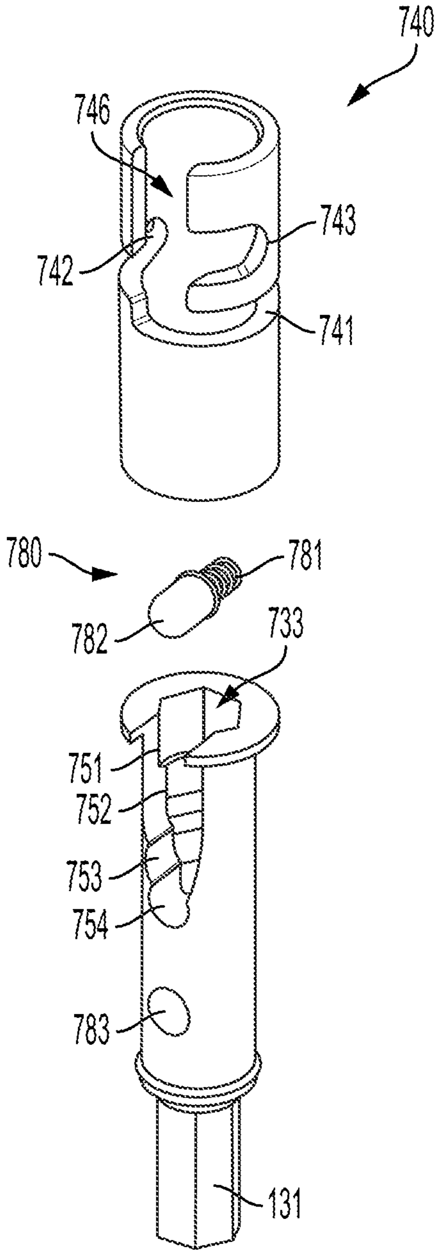
FIG. 40 is an exploded perspective view of the exemplary embodiment of the tool holder.

As shown in FIGS. 34 and 35, the tool holder 730 also includes a sleeve 740. The sleeve has a central opening 746 that runs axially. Communicating with the central opening 746, the sleeve 740 has three circumferential openings 741, 742 and 743. The circumferential openings 741, 742 and 743 extend circumferentially from the central opening 746. Each of the circumferential openings have a different size. The circumferential opening 743 having the greatest height (the axial front to rear direction) and the circumferential opening 741 having the smallest height. FIG. 40 illustrates an exploded view of the tool holder 730 and the sleeve 740 can be seen in FIG. 40 as a separate element.

Figure 42:
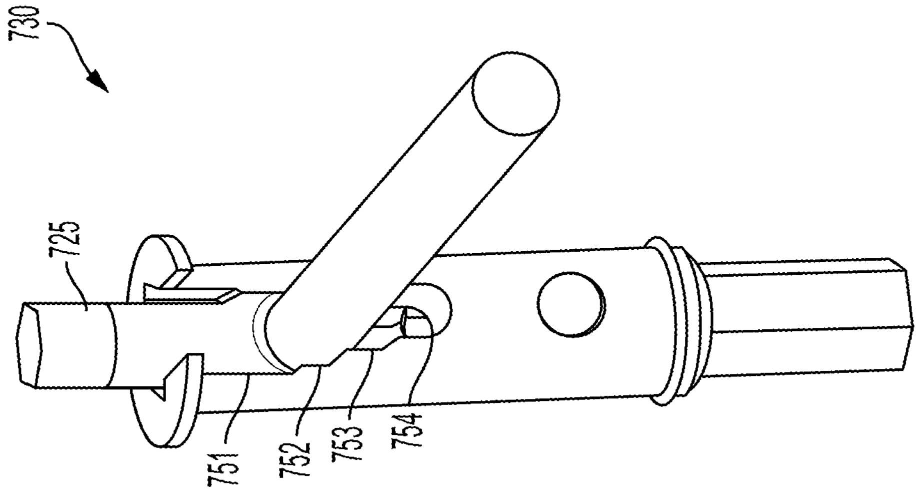
FIG. 42 is another perspective view of the exemplary embodiment of the tool holder.
Figure 41:
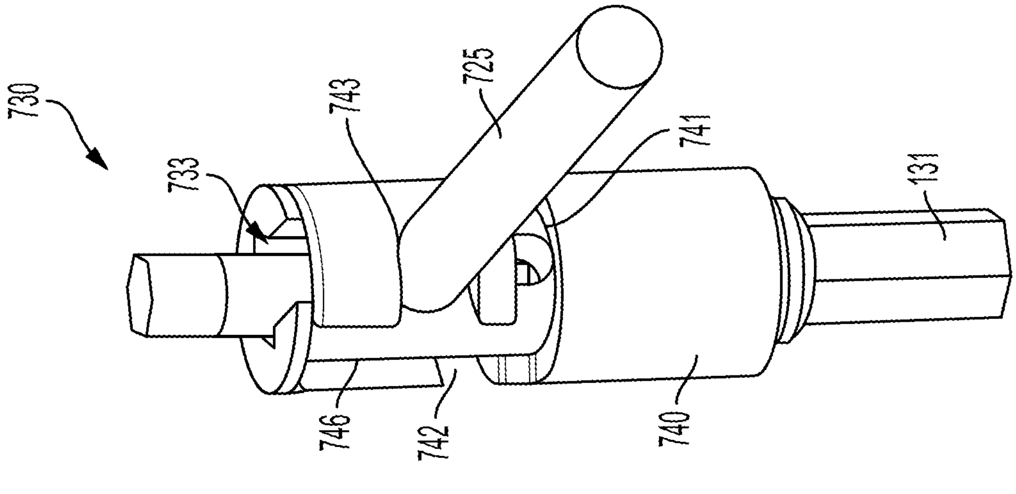
FIG. 41 is another perspective view of the exemplary embodiment of the tool holder.
Figure 44:
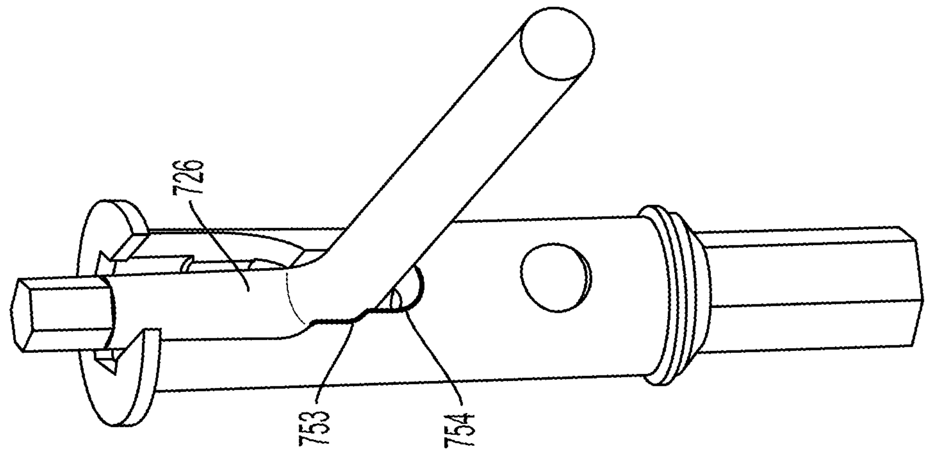
FIG. 44 is another perspective view of the exemplary embodiment of the tool holder.
Figure 43:
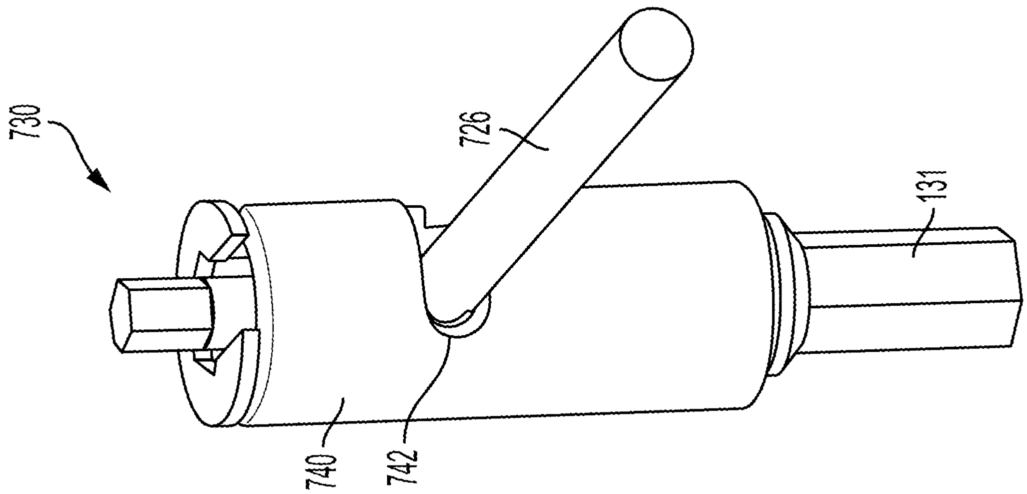
FIG. 43 is another perspective view of the exemplary embodiment of the tool holder.
Figure 46:
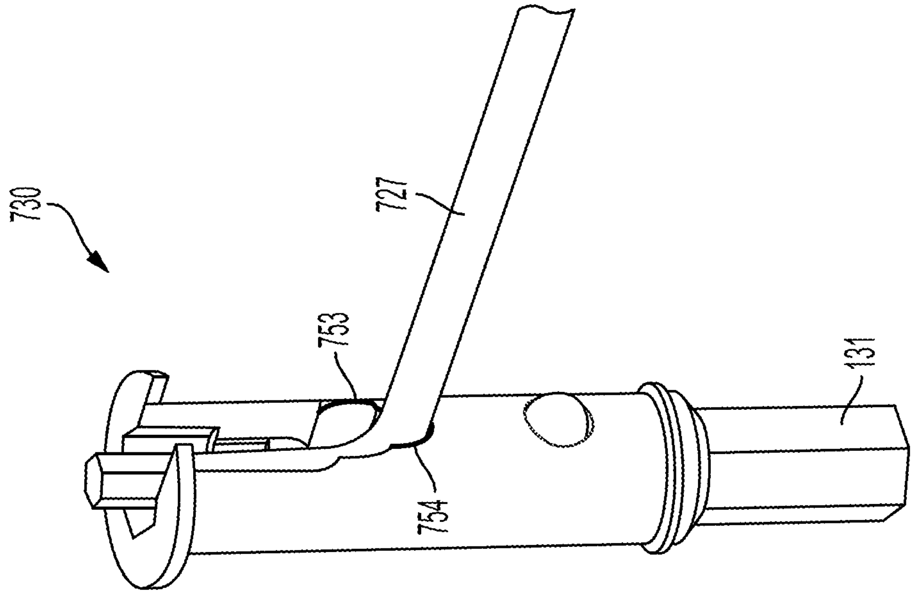
FIG. 46 is another perspective view of the exemplary embodiment of the tool holder.
Figure 45:
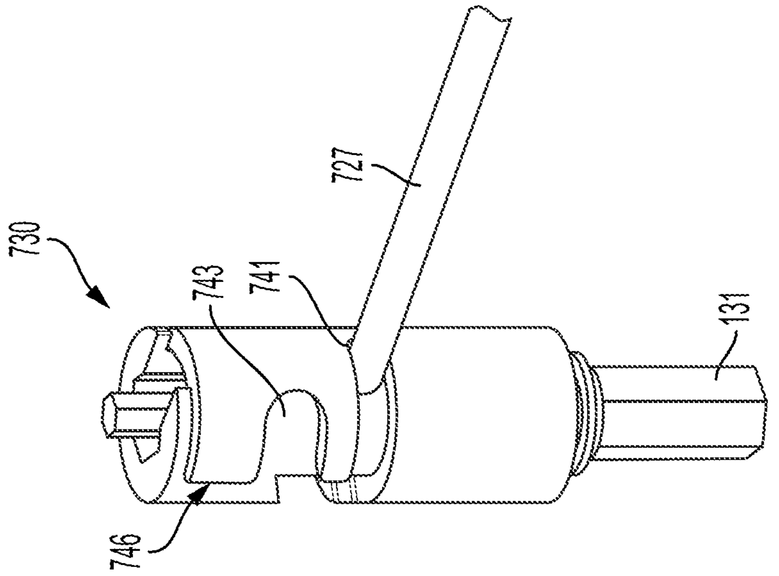
FIG. 45 is another perspective view of the exemplary embodiment of the tool holder.

Operation of the tool holder 730 will now be described with reference to FIGS. 41-46. FIGS. 41, 43 and 45 illustrate the tool holder 730 including the sleeve 740. FIGS. 42, 44 and 46 illustrate corresponding views with the sleeve 740 removed.

FIGS. 41 and 42 illustrate the tool holder 730 holding a hex key 725. The hex key 725 has a diameter of roughly 5 mm. Accordingly, it seats in the stepped section 752.

In order to insert the hex key 725, the sleeve 740 is first rotated to the position shown in FIGS. 34 and 35, in which the central opening 746 of the sleeve 740 is aligned with the opening 736 of the stepped section 733. That allows a user to insert the hex key 725 into the retainer 733.

After the hex key 725 reaches the stepped section 752, it can no longer be inserted any further owing to the fact that it cannot fit into the stepped section 753 as it is too large to fit into that section. Accordingly, the hex key 725 sits in the stepped section 752. Then, a user may rotate the sleeve 740 in a clockwise direction. This rotates the sleeve 740 so that the hex key 725 fits into the opening 743 of the sleeve 740, as is shown in FIG. 41. As will be appreciated, this secures the hex key 725 in place. The hex key 725 can be removed by returning the sleeve 740 to the initial position and removing the hex key 725.

FIGS. 43 and 44 illustrate the tool holder 730 holding a hex key 726. The hex key 726 has a diameter of roughly 4 mm. Accordingly, it seats in the stepped section 753.

In order to insert the hex key 726, the sleeve 740 is first rotated to the position shown in FIGS. 34 and 35, in which the central opening 746 of the sleeve 740 is aligned with the opening 736 of the stepped section 733. That allows a user to insert the hex key 726 into the retainer 733.

After the hex key 726 reaches the stepped section 753, it can no longer be inserted any further owing to the fact that it cannot fit into the stepped section 754 as it is too large to fit into that section. Accordingly, the hex key 726 sits in the stepped section 753. Then, a user may rotate the sleeve 740 in a counter-clockwise direction. This rotates the sleeve 740 so that the hex key 726 fits into the opening 742 of the sleeve 740, as is shown in FIG. 43. As will be appreciated, this secures the hex key 726 in place. The hex key 726 can be removed by returning the sleeve 740 to the initial position and removing the hex key 726.

FIGS. 45 and 46 illustrate the tool holder 730 holding a hex key 727. The hex key 727 has a diameter of roughly 3 mm. Accordingly, it seats in the stepped section 754.

In order to insert the hex key 727, the sleeve 740 is first rotated to the position shown in FIGS. 34 and 35, in which the central opening 746 of the sleeve 740 is aligned with the opening 736 of the stepped section 733. That allows a user to insert the hex key 727 into the retainer 733.

After the hex key 727 reaches the stepped section 754, it can no longer be inserted. Accordingly, the hex key 727 sits in the stepped section 754. Then, a user may rotate the sleeve 740 in a clockwise direction. This rotates the sleeve 740 so that the hex key 727 fits into the opening 741 of the sleeve 740, as is shown in FIG. 45. As will be appreciated, this secures the hex key 727 in place. The hex key 727 can be removed by returning the sleeve 740 to the initial position and removing the hex key 727.

Although not shown, a hex screwdriver bit can be fit into the first section 751 of the stepped retainer 733 when the sleeve 740 is in any position. It may be advantageous to have the sleeve 740 rotated to one of the positions shown in FIG. 41, 43 or 45 so that the opening 736 is closed. The hex screwdriver bit can be any of the dimensions discussed previously. By providing the stepped section 751, the tool holder 730 can accommodate a relatively short hex screwdriver bit.

Figure 37:
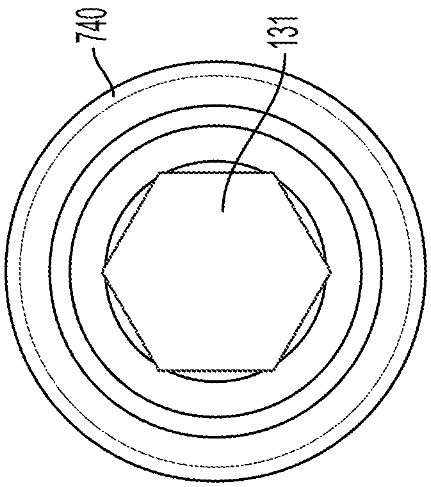
FIG. 37 is a bottom view of the exemplary embodiment of the tool holder.
Figure 36:
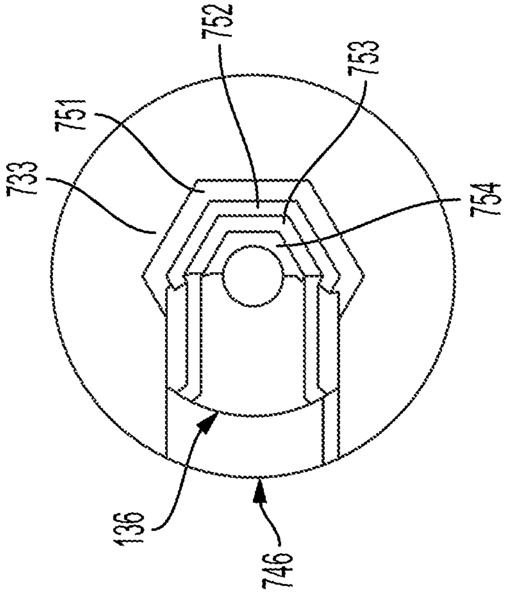
FIG. 36 is a top view of the exemplary embodiment of the tool holder.
Figure 39:
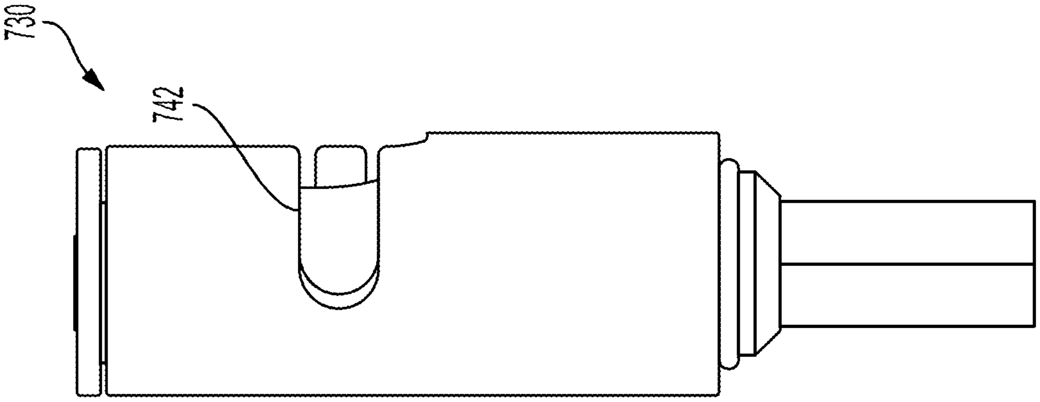
FIG. 39 is another side view of the exemplary embodiment of the tool holder.
Figure 38:
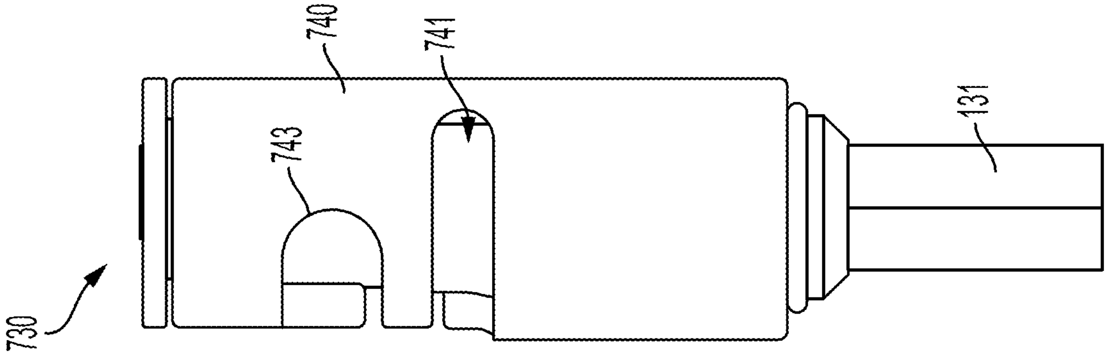
FIG. 38 is another side view of the exemplary embodiment of the tool holder.

FIGS. 36-39 illustrate other various views of the tool holder 730. FIG. 36 is a top view and FIG. 37 is a bottom view. FIGS. 38 and 39 are side views.

As discussed previously, FIG. 40 is an exploded view. As shown in FIG. 40, the tool holder 730 may include a biased projection 780. The biased projection includes a spring 781 and a projection member 782. The projection 780 first into a hole 783 and the projection member 781 projects out to contact an inner surface of the sleeve 740. This causes the sleeve 740 to resist relative movement. That is, the sleeve 740 will remain in place relative to the retainer 733 due to the projection 780 unless acted upon by another force. The resistance to movement is relatively minor such that a user is able to relatively rotate the sleeve 740. However, the sleeve 740 stays in place unless rotated by the user. As will be appreciated, the particular force and resistance to movement can be changed by changing things such as the size and force of the spring 781 and the size, shape and material of the projection member 782.

Although the stepped sections 751, 752, 753 and 754 are shown with a partially hexagonal shape, the stepped sections can have a circular shape or the shapes can be mixed. In particular, stepped section 751 may have the partially hexagonal shape, and sections 752, 753 and 754 may have circular cross-sectional shapes. This would allow a hex screwdriver bit to be held by the stepped section 751, while the sections 752, 753 and 754 would accommodate hex keys.

As is understood, a user can insert and remove the various hex keys and bit holders. Additionally, the user can drive fasteners with each of the hex keys and bit holders. Accordingly, it is contemplated that the present exemplary embodiment includes the method of inserting, securing and using the various hex keys and bit holders.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

What is claimed is:

1. A power tool, comprising: a housing; a motor housed in the housing; and a tool holder driven by the motor; wherein the tool holder is configured to selectively hold one of a screwdriver bit and a hex key; wherein the hex key comprises a first leg, a second leg and a bend between the first leg and the second leg; and wherein the screwdriver bit comprises a hexagonal section and a driving head, the driving head configured to engage a fastener; wherein the tool holder comprises a side opening; wherein the side opening is configured such that one of the first leg and the second leg project through the side opening when the tool holder is holding the hex key; and wherein the tool holder comprises a rotary member which is configured to be rotated so as to secure and release the one of the screwdriver bit and the hex key wherein the tool holder is integral with the power tool; wherein the tool holder has a forward end; wherein the tool holder is configured so that when holding the screwdriver bit the driving head of the screwdriver bit projects out of the forward end; and wherein the side opening is open towards the forward end.

2. The power tool of claim 1, wherein the tool holder comprises a rotational axis; and further comprising a magnet offset from the rotational axis.

3. The power tool of claim 2, wherein the magnet is disposed at the side opening.

4. The power tool of claim 1, wherein the tool holder comprises a rotational axis;

wherein the tool holder comprises a first magnet and a second magnet;

wherein the second magnet is offset from the rotational axis.

5. The power tool of claim 4, wherein the first magnet is aligned with the rotational axis.

6. The power tool of claim 1, wherein the tool holder further comprises a stepped retainer;

wherein the stepped retainer comprises a partial hexagonal shape;

wherein the stepped retainer includes a first section of a first size; a second section of a second size, a third section of a third size and a fourth section of a fourth size;

wherein the first section is closer to a forward end of the power tool than the second section, the third section and the fourth section;

wherein the first section is larger than the second section, the third section and the fourth section; and wherein the fourth section is farther from the forward end of the power tool than the first section, the second section and the third section;

wherein the fourth section is smaller than the first section, the second section and the third section;

wherein the tool holder further comprises a sleeve;

wherein the sleeve comprises a central opening that runs axially; and wherein the sleeve comprises at least three circumferential openings that extend circumferentially from the central opening.

7. A power tool comprising:

a housing;

a motor housed in the housing; and a tool holder driven by the motor;

wherein the tool holder is configured to selectively hold one of a screwdriver bit, a first hex key and a second hex key; wherein the first hex key has a first diameter and comprises a first key bend; wherein the second hex key has a second diameter and comprises a second key bend; wherein the second diameter is different than the first diameter; and wherein the screwdriver bit comprises a hexagonal section and a driving head;

wherein the tool holder has a forward end;

wherein the tool holder is configured so that when holding the screwdriver bit the driving head of the screwdriver bit projects out of the forward end; and wherein the side opening is open towards the forward end.

8. The power tool of claim 7, wherein the tool holder is configured such that when the tool holder holds the first hex key, the second leg of the first hex key projects forward along a rotational axis of the tool holder.

9. The power tool of claim 8, wherein the tool holder is configured such that when the tool holder holds the screwdriver bit, the screwdriver bit projects forward along a rotational axis of the tool holder.

10. The power tool of claim 7, wherein the tool holder is integral with the power tool.

11. A power tool comprising:

a housing;

a motor housed in the housing; and a tool holder driven by the motor;

wherein the tool holder is configured to selectively hold one of a screwdriver bit and a hex key; wherein the hex key includes a first leg, a bend and a second leg transverse to the first leg; and wherein the screwdriver bit comprises a hexagonal section and a driving head, the driving head configured to engage a fastener;

wherein the tool holder comprises a side opening;

wherein the tool holder is configured such that when the tool holder holds first hex key, the first leg of the hex key projects out of the side opening and the second leg of the hex key projects forward;

wherein the tool holder comprises a rotational axis; and further comprising a first magnet offset from the rotational axis.

12. The power tool of claim 11, wherein the first magnet is disposed at the side opening.

13. The power tool of claim 11, wherein the tool holder comprises a rotational axis;

wherein the tool holder further comprises a second magnet.

14. The power tool of claim 13, wherein the second magnet is aligned with the rotational axis.

15. The power tool of claim 11, wherein the tool holder is integral with the power tool.

* * * * *